United States Patent
Clemenzi et al.

(10) Patent No.: US 11,241,799 B2
(45) Date of Patent: Feb. 8, 2022

(54) SOLAR ENERGY ARRAY ROBOTIC ASSEMBLY

(71) Applicant: INTELLI-PRODUCTS INC., Asheville, NC (US)

(72) Inventors: Richard A Clemenzi, Asheville, NC (US); Judith A Siglin, Asheville, NC (US)

( * ) Notice: Subject to any disclaimer, the term of this patent is extended or adjusted under 35 U.S.C. 154(b) by 234 days.

(21) Appl. No.: 16/102,725

(22) Filed: Aug. 13, 2018

(65) Prior Publication Data

US 2019/0134822 A1 May 9, 2019

Related U.S. Application Data

(63) Continuation-in-part of application No. PCT/US2017/023109, filed on Mar. 18, 2017.
(Continued)

(51) Int. Cl.
*B23P 19/04* (2006.01)
*B63B 35/44* (2006.01)
(Continued)

(52) U.S. Cl.
CPC .............. *B25J 11/005* (2013.01); *B23P 19/04* (2013.01); *H02S 10/40* (2014.12); *H02S 20/00* (2013.01);
(Continued)

(58) Field of Classification Search
CPC .............. B63B 2035/4453; H02S 10/40; H02S 20/00; H02S 20/10; H02S 20/32;
(Continued)

(56) References Cited

U.S. PATENT DOCUMENTS 3,743,120 A * 7/1973 Schmidt .................... B60P 1/02
414/495
4,676,713 A * 6/1987 Voelpel ................ B65G 49/061
414/590
(Continued)

FOREIGN PATENT DOCUMENTS

CN 104649023 A * 5/2015
EP 3709506 A1 * 9/2020 ............. H02S 20/00
(Continued)

OTHER PUBLICATIONS

Machine Translation of JP-2014031246-A (Year: 2014).*

*Primary Examiner* — Jacob J Cigna

(57) ABSTRACT

A new and highly optimized solar photovoltaic (PV) system including: 1) field deployable fully automated solar PV robotic array assembly and installation system, 2) solar PV panel wiring and power conversion system designed to allow tracking panel-to-panel shading while maintaining maximized power output, 3) combined structural and electrical inter-panel connector system supporting the new wiring scheme, 4) panel structural supports for the automated assembly and new inter-panel connector systems, and 5) fully automated post installer for posts supporting the large robotically assembled solar array sections. It is a fully integrated system for rapid installation, lower cost, higher energy output, and higher quality assembly of PV arrays, including tracking and floating arrays, which together create a transformative advancement for the solar energy industry.

12 Claims, 24 Drawing Sheets

Related U.S. Application Data

(60) Provisional application No. 62/544,891, filed on Aug. 13, 2017, provisional application No. 62/458,842, filed on Feb. 14, 2017, provisional application No. 62/323,609, filed on Apr. 15, 2016, provisional application No. 62/310,339, filed on Mar. 18, 2016.

(51) Int. Cl.

| | |
|---|---|
| *H02S 10/40* | (2014.01) |
| *H02S 99/00* | (2014.01) |
| *B25J 11/00* | (2006.01) |
| *H02S 20/00* | (2014.01) |
| *H02S 20/32* | (2014.01) |
| *H02S 30/00* | (2014.01) |
| *H02S 40/30* | (2014.01) |
| *H02S 40/36* | (2014.01) |
| *H02S 50/00* | (2014.01) |
| *H02S 20/10* | (2014.01) |

(52) U.S. Cl.
CPC .............. *H02S 20/10* (2014.12); *H02S 20/32* (2014.12); *H02S 30/00* (2013.01); *H02S 40/30* (2014.12); *H02S 40/36* (2014.12); *H02S 50/00* (2013.01); *H02S 99/00* (2013.01); *B63B 2035/4453* (2013.01)

(58) Field of Classification Search
CPC .......... H02S 30/00; H02S 40/30; H02S 40/36; H02S 50/00; H02S 99/00; B23P 19/04; B25J 11/005
See application file for complete search history.

(56) References Cited

U.S. PATENT DOCUMENTS

| | | | | |
|---|---|---|---|---|
| 5,595,313 | A * | 1/1997 | Kroll | B66C 23/50 104/3 |
| 7,763,835 | B2 * | 7/2010 | Romeo | G01S 3/7861 250/203.4 |
| 8,657,991 | B2 * | 2/2014 | Potter | F24S 25/33 156/297 |
| 8,671,930 | B2 * | 3/2014 | Liao | F24S 25/12 126/576 |
| 9,048,780 | B2 * | 6/2015 | Caster | H02S 10/40 |
| 9,218,013 | B2 * | 12/2015 | Kikinis | H02S 40/30 |
| 9,413,287 | B2 * | 8/2016 | Hartelius | F24S 25/10 |
| 9,457,463 | B2 * | 10/2016 | Tadayon | B25J 5/00 |
| 9,472,701 | B2 * | 10/2016 | Goyal | H01L 31/04 |
| 9,708,139 | B2 * | 7/2017 | Kamata | G01S 17/50 |
| 10,024,050 | B2 * | 7/2018 | Merrifield | B64G 1/44 |
| 10,784,814 | B2 * | 9/2020 | Wang | H02S 30/00 |
| 10,807,685 | B2 * | 10/2020 | Petrin | H01L 31/02021 |
| 11,067,313 | B2 * | 7/2021 | Port | H02S 20/22 |
| 2006/0090789 | A1 * | 5/2006 | Thompson | H02S 20/00 136/246 |
| 2006/0099064 | A1 * | 5/2006 | Anaki | B65G 49/068 414/797 |
| 2007/0234945 | A1 * | 10/2007 | Khouri | B63B 35/44 114/266 |
| 2008/0029148 | A1 * | 2/2008 | Thompson | F24S 30/425 136/244 |
| 2008/0262669 | A1 * | 10/2008 | Smid | G05D 1/0278 701/23 |
| 2009/0110525 | A1 * | 4/2009 | Criswell | B25J 9/0093 414/507 |
| 2010/0032004 | A1 * | 2/2010 | Baker | F24S 30/455 136/246 |
| 2010/0212715 | A1 * | 8/2010 | Almy | F24S 25/13 136/245 |
| 2012/0027550 | A1 | 2/2012 | Bellacicco | |
| 2012/0161528 | A1 * | 6/2012 | Mumtaz | H02J 3/383 307/82 |
| 2012/0279557 | A1 * | 11/2012 | Alwitt | F24S 25/50 136/251 |
| 2013/0118099 | A1 * | 5/2013 | Scanlon | H02S 20/22 52/173.3 |
| 2013/0340807 | A1 * | 12/2013 | Gerwing | H01L 31/02 136/246 |
| 2014/0033511 | A1 * | 2/2014 | Swahn | H02S 40/36 29/592.1 |
| 2014/0158649 | A1 * | 6/2014 | Al-Haddad | F16M 11/00 211/41.1 |
| 2014/0196767 | A1 * | 7/2014 | Houle | H02S 30/00 136/251 |
| 2014/0312700 | A1 * | 10/2014 | Catthoor | H01L 31/02021 307/77 |
| 2014/0360552 | A1 * | 12/2014 | Britcher | H01L 31/18 136/244 |
| 2015/0162458 | A1 * | 6/2015 | Vatelmacher | H02J 1/12 307/77 |
| 2015/0178440 | A1 * | 6/2015 | Fink | G06F 30/00 716/122 |
| 2016/0065116 | A1 * | 3/2016 | Conger | H02S 20/10 136/251 |
| 2016/0065121 | A1 * | 3/2016 | Bugg | H01L 31/02 29/525.08 |
| 2016/0087132 | A1 * | 3/2016 | Alteneiji | H01L 31/035281 136/244 |
| 2017/0137238 | A1 | 5/2017 | Kamata | |
| 2019/0341880 | A1 * | 11/2019 | Wang | H02S 20/00 |
| 2020/0369350 | A1 * | 11/2020 | Nagai | B63B 35/44 |
| 2020/0389120 | A1 * | 12/2020 | El Hajje | H02S 20/00 |

FOREIGN PATENT DOCUMENTS

| | | | | |
|---|---|---|---|---|
| EP | 3571762 | B1 * | 11/2020 | ............ H02S 20/30 |
| EP | 3799297 | A1 * | 3/2021 | ............ H02S 10/12 |
| FR | 3084052 | A1 * | 1/2020 | ............ F24S 25/10 |
| JP | 2014031246 | A * | 2/2014 | |
| WO | WO-2012167130 | A2 * | 12/2012 | ............ H02S 30/10 |
| WO | WO-2018182113 | A1 * | 10/2018 | ............ B25J 18/00 |

* cited by examiner

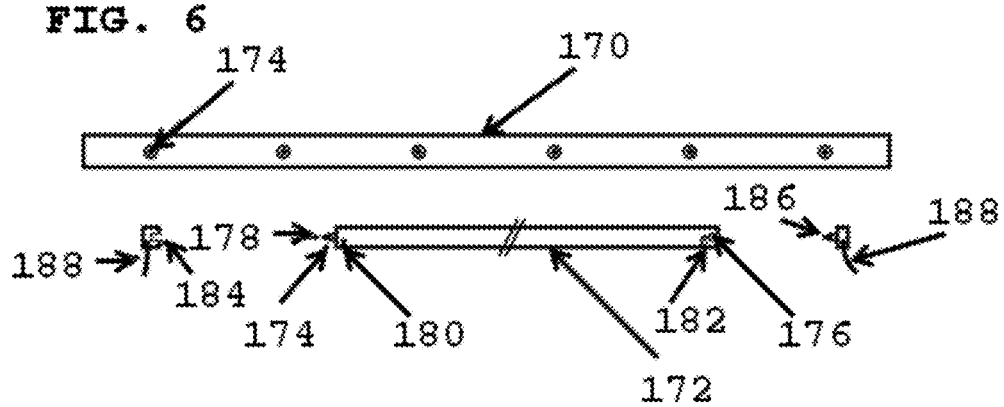
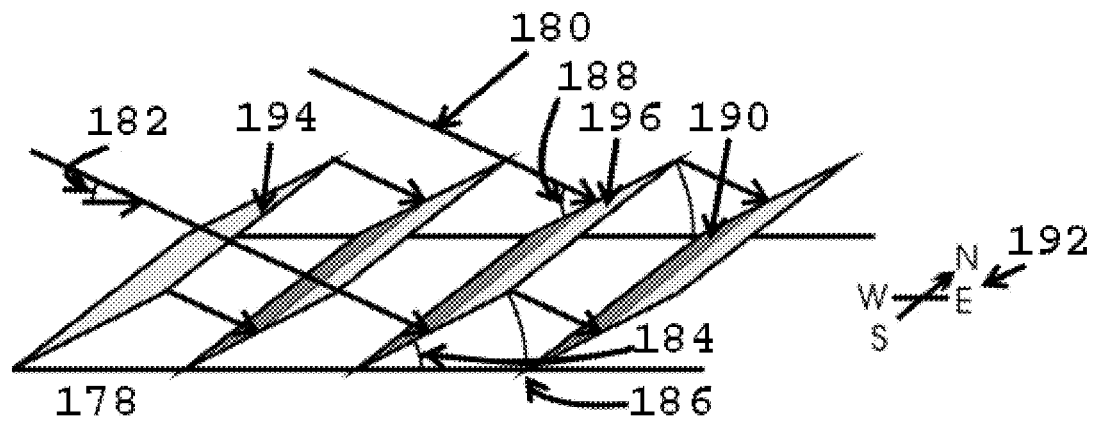

SOLAR ENERGY ARRAY ROBOTIC ASSEMBLY

CROSS-REFERENCE TO RELATED APPLICATIONS

This is a continuation-in-part of PCT/US2017/023109, filed Mar. 18, 2017, and published as No. WO 2017/161358. Priority is claimed from the following four U.S. provisional patent applications: Ser. No. 62/310,339, filed Mar. 18, 2016; Ser. No. 62/323,609, filed Apr. 15, 2016; Ser. No. 62/458,842, filed Feb. 14, 2017; and Ser. No. 62/544,901, filed Aug. 13, 2017.

BACKGROUND OF THE INVENTION

The invention relates to the field of solar energy photovoltaic (PV) systems, panels, and installation.

SUMMARY OF THE INVENTION

In one aspect, apparatus for automated on-site assembly of solar PV energy collection arrays at a site is provided. The apparatus includes a common wiring scheme that separately connects cell rows, including fully-lit, partially-lit, or fully-shaded cell rows; inter-panel connectors to support both the common wiring scheme and fast array assembly; and a panel support structure for fast array assembly to mount panels using the new combined structural and electrical inter-panel connectors.

In another aspect, apparatus is provided including common electrical circuits to optimize tracking solar PV energy collection in dense arrays where intentional parallel shading occurs. The apparatus includes parallel rows of PV cells hard wired into separate electrical circuits; and the separate electrical circuits including at least one circuit for rows which are fully sunlit, at least one circuit for rows which are fully shaded, and at least one circuit for rows which are partially shaded.

In yet another aspect, apparatus in the form of a field-deployable robotic system for automated assembly and installation of solar arrays is provided. The apparatus includes a robotic system for assembling fully completed array sections from component elements and flatbed trucks; and a system for delivering completed array sections directly to their permanent location support posts without the assistance of any manually installed supports or rails. The robotic system is contained in a shipping container with self-deploying sides to form a work platform.

In yet another aspect, a method of building a solar array directly from components delivered in shipping containers and on trucks is provided. The method includes the steps of: (a) moving a robotic system to a desired position for an array being installed; (b) unloading components from shipping containers, including unpacking components as necessary to be ready for use; (c) installing array supports, including repeating step (b) as needed to unload more supports; (d) completing automated assembly of one array section, including repeating step (b) as needed to unload more array section components; (e) moving the completed array section to its final installed supports; and repeating steps (c) through (e) as needed until the entire solar array is installed.

In yet another aspect, the field-deployable robotic apparatus for automated assembly and installation of floating solar arrays is provided. The apparatus includes the robotic PV array section assembly system for assembling fully completed array sections from component elements and flatbed trucks; a system for delivering completed array sections in continuous rows or combinations of rows to the body of water; and a system for connecting the new floating rows to already delivered and floating rows to form a larger complete floating PV array. The robotic system is contained in a shipping container with self-deploying sides to form work platforms, and includes additional apparatus to facilitate row-to-row assembly and feeding of assembled parts of the rows into the water.

BRIEF DESCRIPTION OF THE DRAWINGS

FIG. 6 is a depiction of panel-to-panel embedded connectors for rapidly installing panels with long strings of shade-common circuits;

FIG. 7 is a depiction of an inter-row shade-common effect;

DETAILED DESCRIPTION

Figure 1:
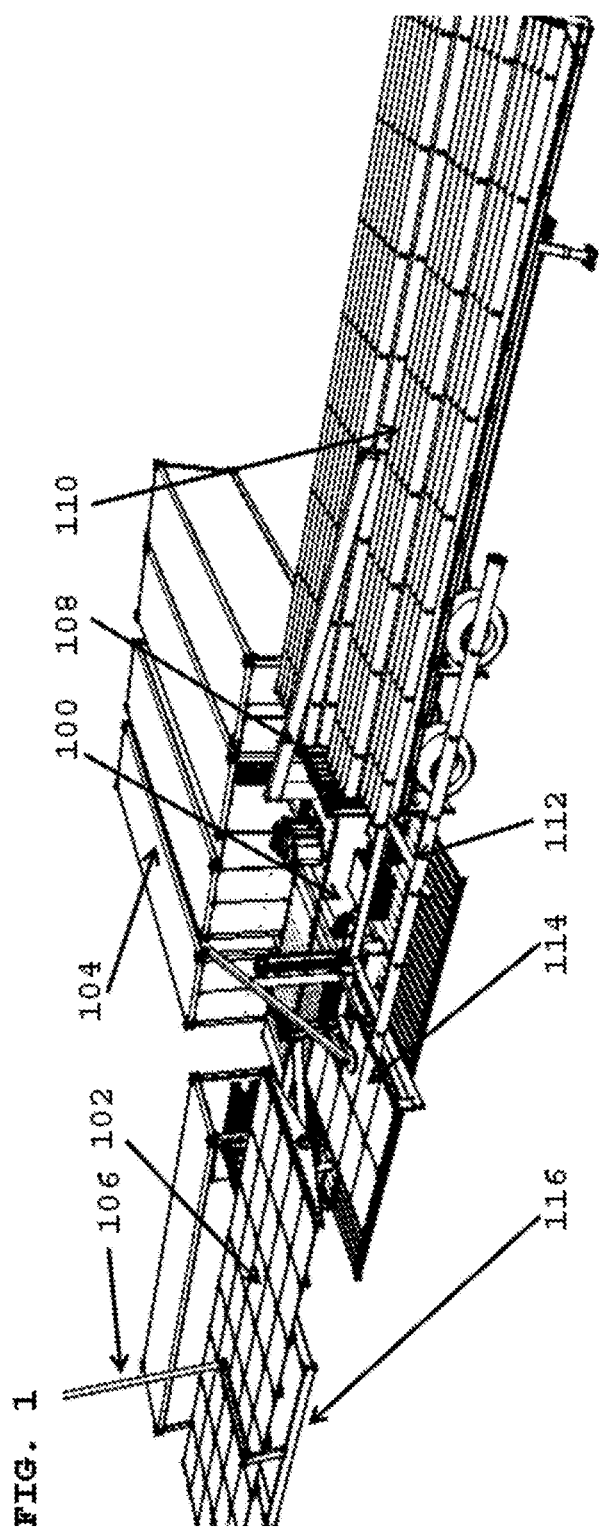
FIG. 1 is a wide view of one embodiment of the main element of a robotic assembly system apparatus.

This invention advances solar PV energy system cost-effectiveness by providing a new fully integrated PV panel, electrical, mounting, and installation system that reduces cost, increases deployment speed, increases quality control, and increases power output. It integrates synergistic PV panel upgrades, PV electrical system upgrades, and in-the-field robotic assembly of PV arrays. This integrated system facilitates rapid deployment of turn-key utility-scale and large commercial PV array solutions with significantly higher energy output per unit area, including for floating arrays, bifacial arrays, and on commercial rooftops.

At the core of this integrated solution is the triad of a new "shade-common" PV cell and panel wiring scheme, inter-panel connector system, and mounting and installation systems. Tracking solar collectors yield the highest power output per PV panel, but tracking always requires using extra land to avoid power reducing row-to-row shading. The root of this limitation is in the way solar "cells" are wired together within each panel. We present a new way to wire the panels themselves and the rows/columns of a PV array to eliminate the power degradation from row-to-row or panel-to-panel shading while tracking. The secret is to realize that similarly shaded PV cells produce similar electrical outputs, and parallel panel-to-panel shading produces columns or rows within all panels in a row with common electrical characteristics. Connecting these "shade-common" rows/columns together enables an optimized output power conversion of all PV cells. It is also necessary to be certain that the PV cells themselves are oriented/created to optimize shading in the design direction of the panel-to-panel shading. The same is true with shading from any long straight item that is parallel to solar panels such as a roof ridge line or roof parapet wall. The technique significantly increases overall array power output during panel-to-panel shading by allowing maximum power available from direct sunlight and adding the additional power available from partial and full sky exposure. It also allows for row-to-row backlighting reflection for use with bifacial panels.

This new cell and panel wiring scheme requires more connectors between panels. To make it a more cost-effective overall system, a new combined electrical and structural inter-panel connector and matching structural frame system is included. These new connectors and structural frames allow panels and frame support members to "plug" together without the use of clamps or wires, and only requiring enough bolts to connect the cross frame member to a long truss—no bolts on the panels themselves for mounting. This new structural system is further made cost effective by a new pole mount system using standard screw anchors and a pole such as used for utility poles world-wide. An automated system for installation of these poles with screw anchors is part of the cost-effective new system.

To complete the new cost-effective solar collector system, a fully self contained robotic array assembly system is described for assembly and installation of at least 1 MW of solar array in a single day directly from shipping containers and flatbed trucks with a very small but well paid support team. Delivered as a single "shipping container", the robotic PV array assembly system can go anywhere large solar arrays are being installed. Robotic array assembly together with a new connector method enabled by the shade-common wiring method can reduce the cost of large PV array installation labor costs to $0.07/W or lower from $0.20/W, and improve the density of tracking arrays thus lowering land area and cost significantly. The robotic assembly system is directly designed to work with the new standardized frame structure, and also includes automated mechanical post installation with material delivery and an automated delivery crawler for moving fully completed array sections from the robotic assembly system to their final installation location such that the array section assembly robotic system need only be moved daily as a full large-scale array is built. The robotic array assembly system further can have built-in deploying wheels or tracks so the daily movements on site can be under the assembly system's own power.

All together, this new integrated solar system further facilitates design of standardized array areas and power layout schemes such that all cabling will also be standardized and readily shipped "product-mode" off-the-shelf with the assembly system to each installation site to dramatically reduce on-site electrical work and to eliminate all on-site complexity. The new system turns all electrical work into a plug-and-play mode except for the utility high voltage grid interconnection. It is further possible this can facilitate fully pre-configured product-mode delivery of the high-voltage grid interconnection components needed within the solar array area. The use of standardized array areas even further reduces engineering costs which have been estimated at as much as $0.16/W or 8% of overall solar array installation cost.

This "product-mode" fully automated assembly approach is also extended to floating PV arrays to facilitate large array construction at the same 1 MW per unit per day or better for reservoirs and other bodies of water. For this sort of PV array, a support post system with integrated floats and inter-row structural members is employed, with automated assembly of single or multiple rows of completed PV array sections being formed at the shoreline and continuously fed into the body of water as they are assembled. Once each complete set of one or more array section rows is completed, it is then towed to its final position and connected to other completed row sections with an automated "stitching" bot. This variant of the automated system will facilitate vastly larger floating arrays more cost effectively than have been planned to date.

Regarding the new shade-common wiring scheme, when long rows of panels are tilted there will be 3 parallel sets of cells—1) those in full sun, 2) those in full shade, and 3) those in partial shade/partial sun. Furthermore, in the situation with parallel rows or columns of panels, these shadows are always parallel to the rows/columns of PV cells within panels which will make power output of the cells within each of the "3 sets" of rows/columns well matched and thus well suited for optimum power conversion with an appropriately designed power conversion apparatus. The individual rows/columns of each panel can be wired completely in series based on the equally shaded rows/columns making typically 6 "sets" (equal to the numbers of rows/columns in a panel which are longitudinal to the array rows)—a wiring scheme that does not require any "selection/routing" equipment at each panel. Alternatively, a hybrid arrangement is possible combining circuits at the panel or row level based on their shading such that the power that arrives at the inverters (DC-to-AC converters) is "shade-common" and thus having common electrical conversion parameters. Another way to achieve this involves a new configuration of a solar panel that can direct its own output to one of multiple "shade-common" power busses to provide optimal inputs for the power conversion apparatus. All the new power conversion apparatus herein includes the inter-module communication needed to coordinate circuit connection to any multiple power busses.

This new parallel wiring scheme of a set of series "shade-common" circuits further leads to new inverter apparatus opportunities that can reduce the number or sizes of inverters required for a solar array. These options include using one (1) inverter per shade-common circuit, using a single inverter for all the circuits within parallel panels (e.g., 6 circuits), or using a middle number of inverters based on construction economics and the ability to combine shade-common circuits together before power conversion.

Another new power conversion/inverter system presented takes the various and often different power inputs produced by the shade-common tracking and wiring scheme which optimally converts the inputs to the desired output voltage by use of a magnetic flux additive transformer with flexibly assigned primary circuits. This new transformer-centric power conversion apparatus eliminates the DC-to-DC conversion step by instead direct inverting each DC circuit separately and optimally, and then applying the various AC outputs by flexibly and optimally assigning them to a new transformer with a large number of small primary circuits. The point is to more optimally match the various AC V-I characteristics to numerous primaries which are electronically combined using both parallel and serial combinations properly suited to the V-I characteristic for more optimal conversion. To achieve this, the new transformer will have a significant number of primary coils, with likely candidate numbers being 64, 128, 256, etc. to match digital selection hardware. We term this new magnetic flux additive apparatus a "digital transformer".

This new parallel wiring scheme with a larger number of connectors creates the need to more easily make numerous electrical connections from each PV panel. Currently, a single set of wires manifests from each panel after being connected to the intra-panel circuit in a junction box. Presented is a new way of connection to the inter-panel circuits which both eliminated the junction box and all of its issues, and further provides a more cost effective solution for the numerous "shade-common" circuits (e.g., 6 circuits at each end of the panel). This new "embedded connection" scheme will initially utilize diodes external to the panel, although diodes could be installed with each row inside the panel as part of the panel assembly process. The new embedded connector scheme places one contact of suitable size and durability at the end of each cell row in the panel which is installed as part of the fully automated panel assembly process, with the contact properly positioned or covered for protection from human or metal object contact. Two forms of this new contact are presented, including one embedded between the panel's front and rear sheets, and one which penetrates the rear sheet. The key to both forms of embedded contact is the ease of their inclusion in the panel assembly process such that the result costs less than installation of the current junction boxes while providing the larger number of circuits required for shade-common wiring scheme.

Also claimed are the methods of performing the described automated robotic installation. In all circumstances, the steps involved in such methods will be completed in overlapping time as much as possible to maximize the net throughput of the process.

Cost-effectiveness in solar energy collection systems, especially PV (photovoltaic) systems, is a combined function of their component cost, installation cost, effective energy output, and required maintenance. The energy output of a solar panel is generally maximized when directly facing the sun. There are also new "bifacial" PV cells and panels which further take in light striking their rear side opening up new tracking possibilities for optimal output, including tracking past perpendicular to the sun to intentionally produce reflection "backlighting" from adjacent row of panels.

There have been multiple solar panel mounting and tracking schemes used, generally falling into the following mounting categories: fixed horizontally on the ground or roof, fixed flat to angled roof, fixed angled from ground or roof, tracking on East-West horizontal axis (tracks sun's elevation from South), tracking on axis parallel to earth's axis (axis North-to-South and elevated to match latitude, follows sun from sunrise to sunset), a "two axis tracking" system which is mounted on a single pole and which can optimally aim panels to track the sun across the sky any day of the year, and mounted to floats on bodies of water. Each of these mounting schemes has its advantages and disadvantages. Mounting fixed panels "angled from ground or roof" to improve their solar aim can increase the amount of energy collected, but this mounting scheme is generally not popular because it is unsightly, especially so in residential settings. Mounting "angled from the ground" or "slightly angled from the roof" is the most common commercial panel installation method. Two axis tracking optimizes the energy collection per panel.

With all panel mounting schemes, shading of any part of the solar panel has to date been deemed undesirable for PV panels which have poor electrical characteristics when shaded. One type of panel internal wiring now on the market reduces the effect of shading, but still does not provide optimal power output when some of the cells/rows are shaded and some are in full sun.

Further, net combined per area and per panel output have been limited because inter-panel shading cannot generally be tolerated. When a cell within a panel is shaded, it dramatically changes the electrical power output of that cell, especially the electrical current output. Since each "PV cell" produces a voltage of only about 0.5 VDC, many cells are strung together in series to obtain higher DC voltages before conversion to AC power is performed. Because these are "series" connections, if any one cell is shaded then its lowered current will dramatically affect the output of the whole series or "string". Many other attempts to accommodate such shading have been described, including some with intra-panel parallel wiring but still with a single panel circuit, but none that openly embraces and designs for wholesale across-the-array shading as described herein. By breaking through this previously perceived inter-panel-shading limit, the net power output of an array of PV panels can be dramatically increased.

Further, existing assembly of PV arrays, especially commercial and utility scale arrays, is always a labor intensive activity requiring many clamps and bolts, and significant numbers of workers often at chaotic construction sites. The future of the planet may well depend on acceleration of PV array installation, generating the requirement for faster assembly and lower cost installation.

Referring now to the drawings, FIG. 1 shows a wide view of one embodiment of a robotic assembly apparatus, showing a the robotic assembly apparatus (100) with material shipping containers (104) positioned for automated off-loading, and flatbed trucks with truss sections (110) backed up to the end of the robotic system with the truss crane (108). One truss (112) is loaded onto the robotic system (100) and shown under partial assembly with already installed PV panels (114). Also shown is one fully completed array (102) in the temporary holding position, with a crane ready to lift it for final positioning with the crane attachment (116) shown attached to the crane lift cable (106).

Figure 2:
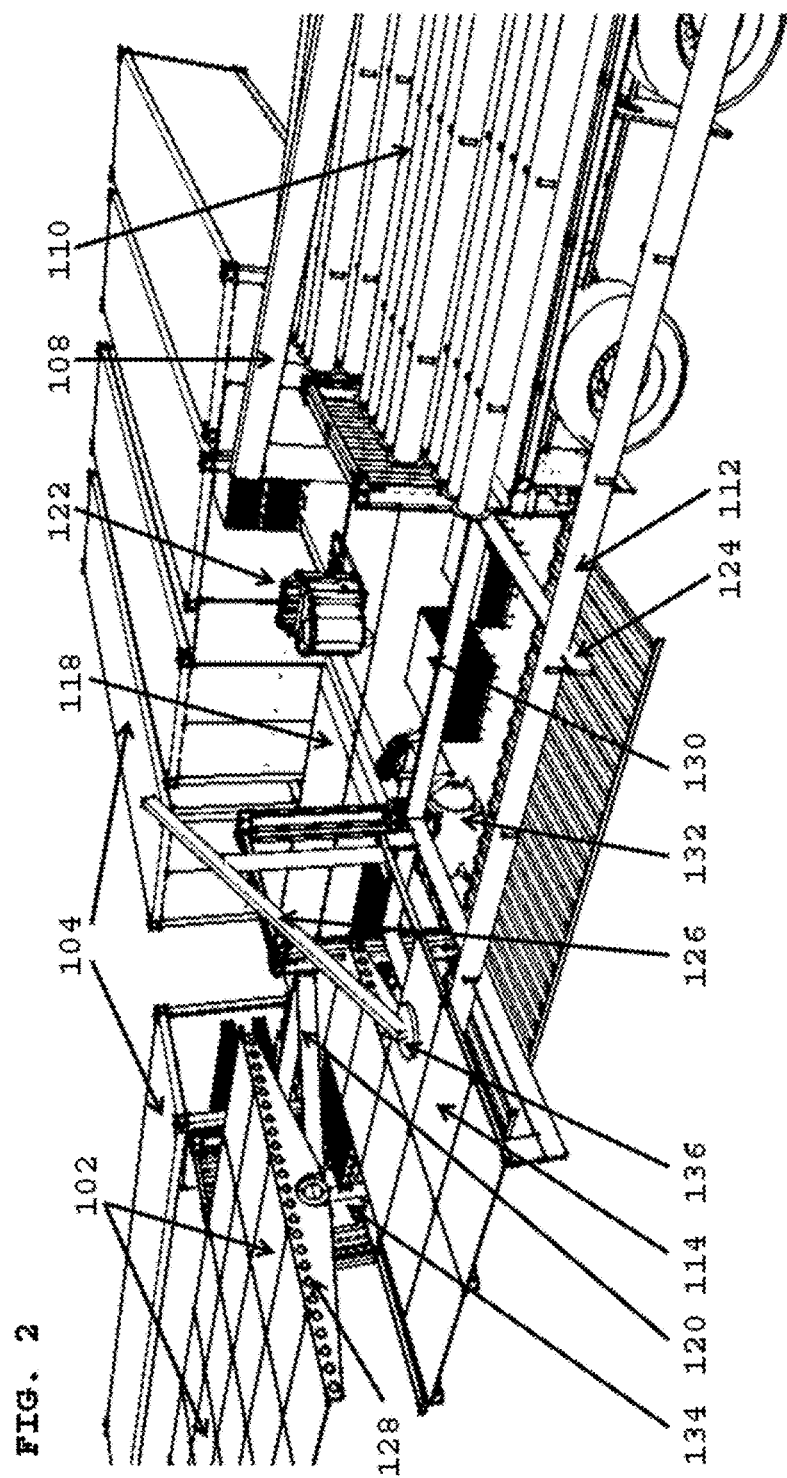
FIG. 2 is a close-up depiction of the field deployable core robotic assembly apparatus.

FIG. 2 shows a close-up depiction of one embodiment of the robotic assembly system showing a completed array section (102) on a support frame in the holding position (120) ready for delivery to mounting posts, with material shipping containers (104) positioned at the unfolded robotic system work platform (118) where the robotic fork lift (122) is shown here entering a shipping container to retrieve material. Also shown is the truss crane robotic device (108) in deployed position to retrieve truss sections from flatbed trucks (110) they are delivered on, with one truss section (112) shown loaded onto the robotic assembly systems support and automated feeding system (124). At the far end of the truss section under assembly we see a panel placement device (126) having already placed panels (114) into position using a panel lifting attachment (136). Other embodiments are also claimed for the panel placement device, including conveyor-like devices. In this view you can also see the holes (128) in a cross member which the combined structural/electrical connectors are inserted through for structural panel support and electrical connection to the next panel. Also shown are some of the material stacks ready for robotic assembly (130) and some of the support apparatus such as a compressor (132) and generator (134).

Figure 3:
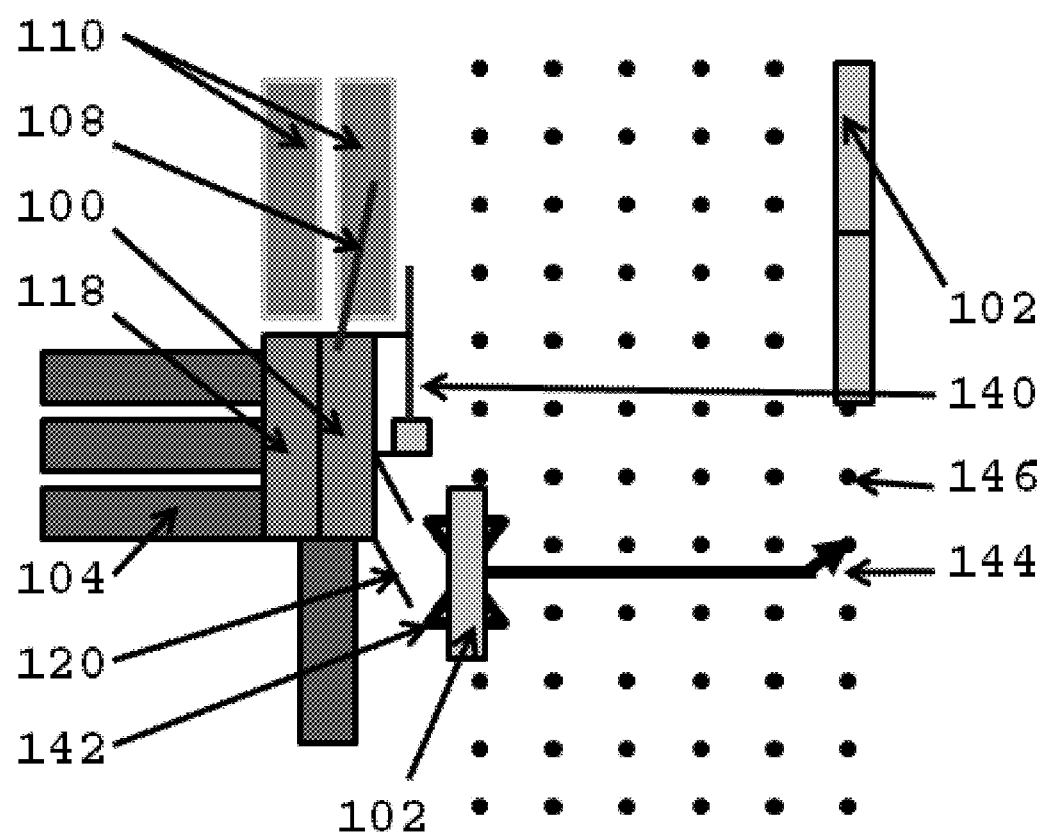
FIG. 3 shows one embodiment of an aerial view of the work layout for the entire robotic assembly system.

FIG. 3 shows an aerial view of one embodiment of a work layout for the robotic assembly apparatus (100) showing its deployed work platform (118) with material shipping containers (104) positioned for robotic unloading, and showing flat bed trucks positioned with material (110) at the truss crane (108) end of the robotic system with one truss and some panels (140) loaded onto the robotic assembly system and partially assembled. From the temporary holding position for completed array sections (120), shown is one completed array section (102) being moved with a robotic crawler (142) via a pre-determined path (144) to its final resting position on posts (146), with some completed array sections (102) having already been installed and more posts (146) already installed and ready for completed array sections.

Figure 4:
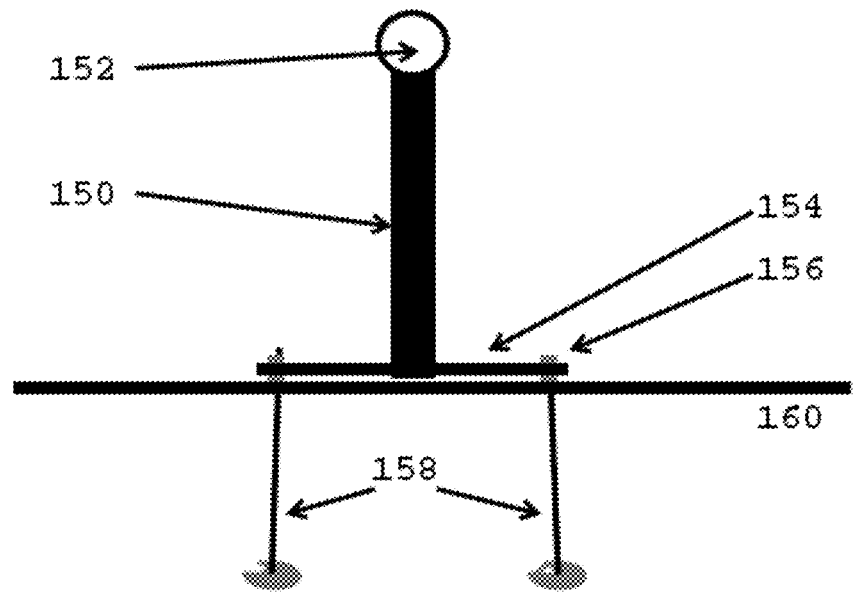
FIG. 4 shows one embodiment of a ground screw anchored mounted post.

FIG. 4 shows one embodiment of a ground screw mounted post (150) where a truss section is mounted (152) in this embodiment with a base plate (154) bolted (156) to the ground anchors (158) which were screwed into the ground (160).

Figure 5:
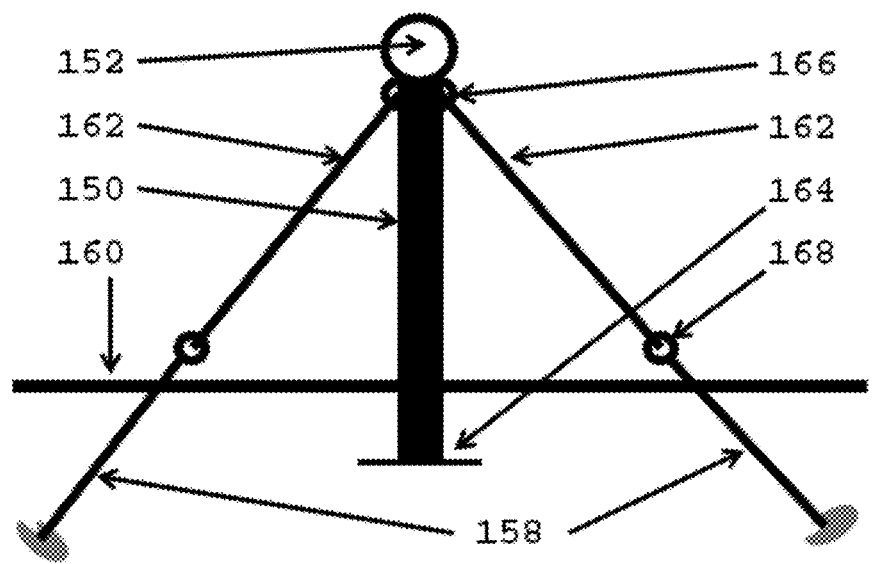
FIG. 5 shows another embodiment of a ground screw anchored post with guy wires.

FIG. 5 shows another embodiment of a ground screw anchored post (150) where a truss section is mounted with guy wires (162) attached at rings (166) on the post (150), where the post has a bottom plate (164) which is partially buried in the ground (160) and the guy wires (162) are also attached to the ground anchors (158) which were screwed into the ground at their top rings (168) to fully secure the post (150).

FIG. 6 shows one embodiment of a combined structural and electrical panel embedded connector for rapidly installing panels with long strings of shade-common circuits. The adjoining panels (170 in cross sectional view and 172 in longitudinal sectional view) have at one end insertion connectors (174) with matching receiving connector jacks (176) on the other end of the panels. A longitudinal cross section of the panel (172) is shown with the insertion connector's conductor (178) on one end and jack (176) on the other end, with sealing o-rings as needed behind the conductor (178) on the connector end to create a weather-tight seal. An optional "connector retraction" mechanism (180) is shown to allow removal and insertion of a panel in the middle of a long set of installed panels. An alternate approach to allow removal and insertion of a panel in the middle of a long set of installed panels is via a removable bottom portion (182) of the panel end containing the jacks (176) such that upon removal of the bottom portion (182), the panel can then be raised off the adjacent connectors (174). A set of string end connectors, jack end (184) and connector end (186) are shown with wires (188) for connecting adjacent panel strings. Connector bodies (174) and (186) provide structural support for the panels by also going through the holes in the cross members as shown in FIG. 2 (128). That the depiction of the connector (174) protruding from the body (170 and 172) is one possible embodiment for showing in this drawing, while the likely implementation is a recessed connector which would be difficult to show.

FIG. 7 shows a parallel row-to-row shading effect associated with the subject invention. Shown are solar panels (114) mounted by some apparatus such as on racks (178) exposed to solar radiation depicted by rays shown at panel corners (180) with the solar to ground angle shown (182) and the panel to ground angle (184) with an inter-panel gap (186) and thus an effective sun-to-panel angle (188) resulting in partial panel shading (190) and partial lit (196) for all except the end panel. The compass rose (192) shows the typical orientation of the articulation shown, with this figure showing east-to-west tracking. Note there will always be a panel at the end of a set of panels that is not shaded (194), but this un-shaded panel will possibly be at alternate ends of the set of panels at different times of the day (e.g., morning versus afternoon).

Figure 8:
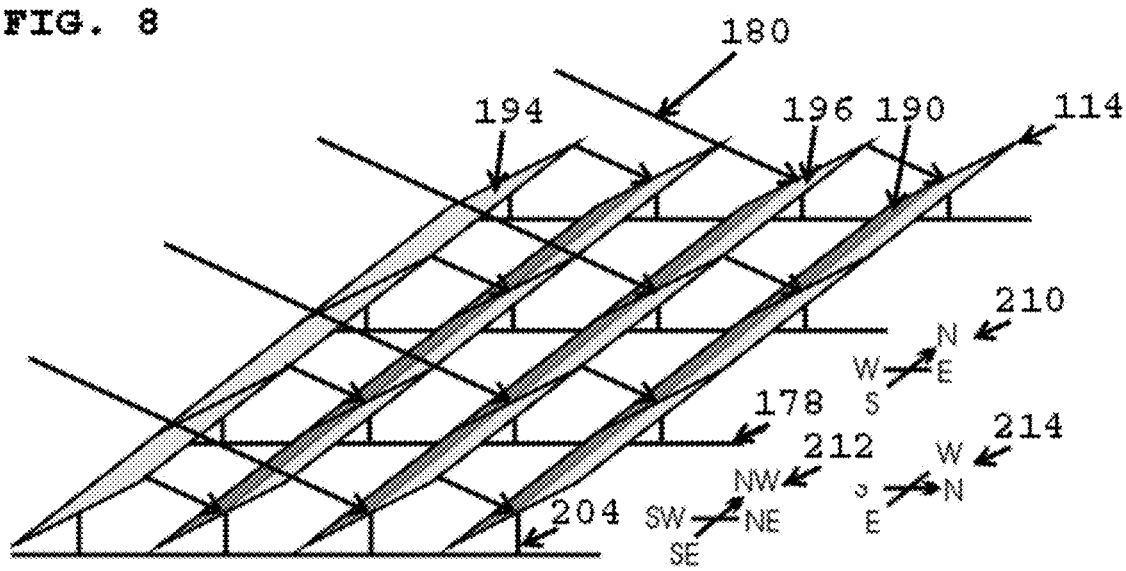
FIG. 8 is a depiction of the shade-common effect with multiple rows of solar panels on a rack system.

FIG. 8 shows one embodiment of an array of solar panels (114) on a rack system (178) this time on vertical standoffs (204) illuminated by the sun as shown by rays (180) at the panel corners thus creating areas of parallel partial shade (190) and areas of parallel partial sun (196), with possibly partially shaded cells at the boundary between the partial shade (190) and partial sun (196) parts of each panel. The set of compass roses (210) (212) and (214) show how this same basic configuration can be used regardless of the exact direction of the rows of panels (114)—parallel panels always produce parallel shadows and thus parallel shade-common sets of cells within panels. Also shown is the fully lit panel row (194) at one side of the array.

Figure 9:
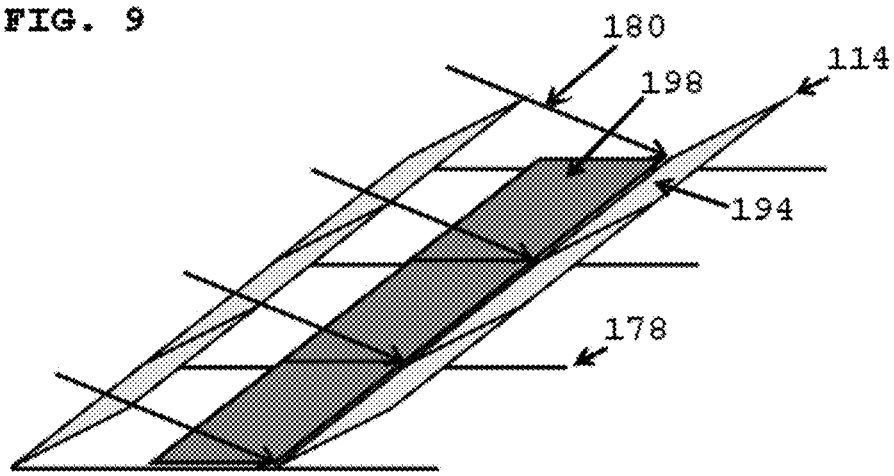
FIG. 9 is a depiction of the same shade-common solar scheme where all panel sets/rows are not always articulated together to optimize net output.

FIG. 9 shows one embodiment of the same shade-common solar scheme but this time where all panel sets/rows are not always articulated together to optimize net output. Shown are panels (114) on racks (178) illuminated by the sun as depicted by rays (180) effecting more fully lit panels (194) and fully-shaded panels (198). The fully shaded panels (198) may sometimes be fully articulated in unison with other panels, and sometimes not articulated for maximizing total array power output.

Figure 10:
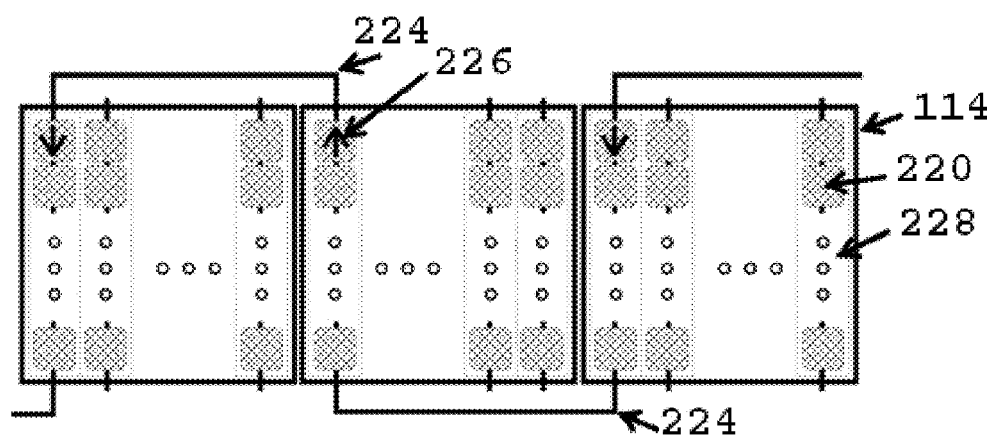
FIG. 10 shows the shade-common fundamental change to intra- and inter-panel wiring.

FIG. 10 shows one embodiment of the fundamental change to intra and inter-panel wiring associated with this invention, where panels (114) containing individual solar cells (220) are connected in series in sets (222) that are series wired (224) to the same shade-common set of solar cells in adjacent panels, and with the panels being oriented so the PV cells within the panels are oriented to conduct (226) in series. The cells are further oriented for optimum power production with shading in the parallel manner described (a function of the foil pattern on the cells). Ellipses, drawn as "ooo" (228), depict rows and columns of cells in both directions.

Figure 11:
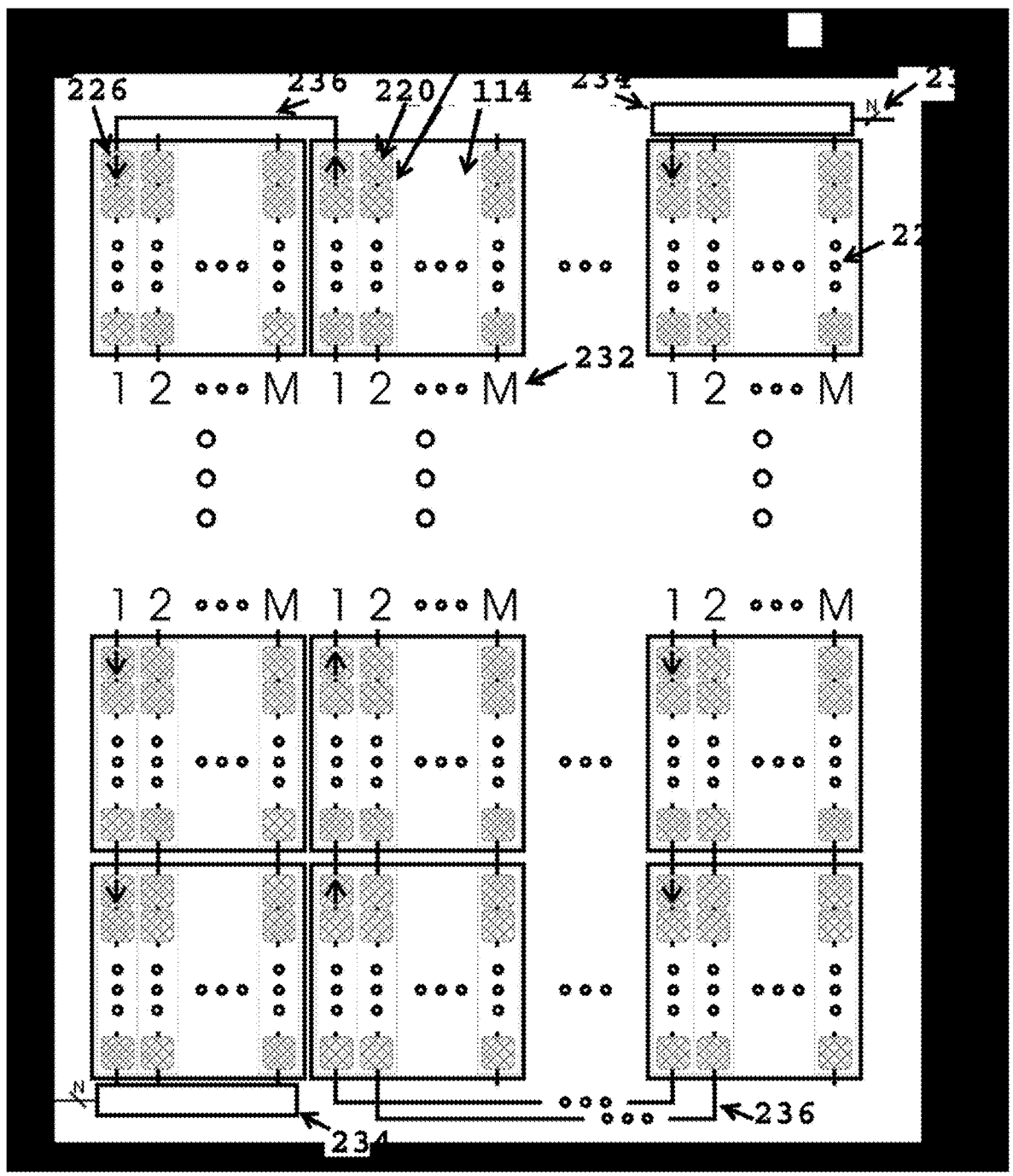
FIG. 11 shows a full array of the shade-common wired solar panels with solar PV cells arranged into series wired sets and oriented for proper electrical conduction.

FIG. 11 shows one embodiment of a full array of solar panels (114) with solar PV cells (220) arranged into series wired sets (224) and oriented for proper conduction (226) with shade common sets of PV cells (230) being here labeled (232) showing the inter-panel shade common sets ("M" equals the number of columns of cells in these panels) that are wired (236) as parallel sets. Ellipses, drawn as "ooo" (228), depict long sets of both panels and cells in both directions. The terminal ends of the array may contain selectors (234) that can reduce the total circuits to being those shaded, partially shaded, fully lit, and other variations may be used that further break down the shaded and lit output circuits (238) to optimize cost (see FIGS. 23-26).

Figure 12:
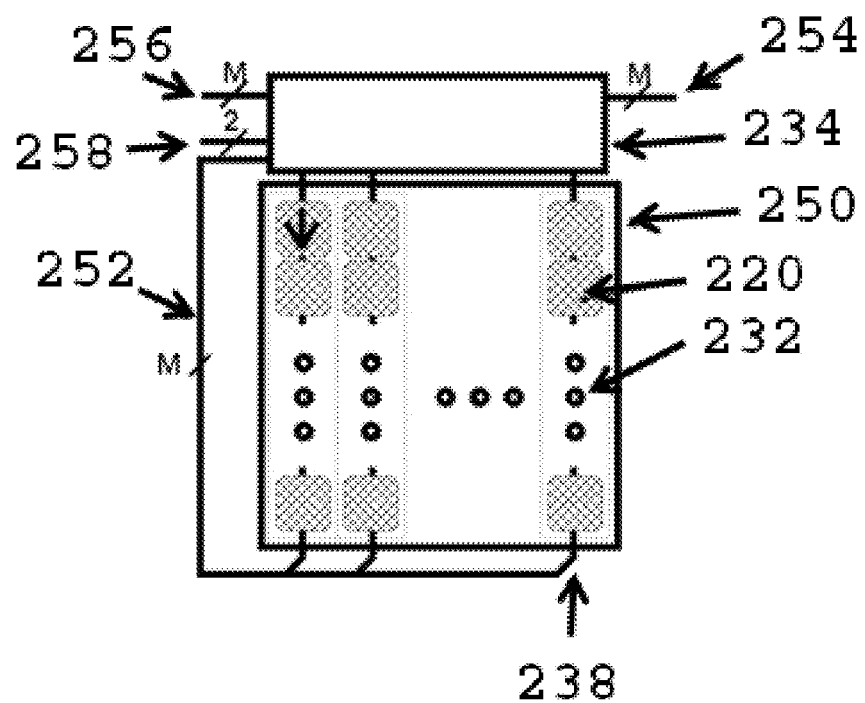
FIG. 12 shows one possible configuration for the "outer rows" or end panels of the shade-common panels.

FIG. 12 shows one possible embodiment of the "outer rows" of panels or end panels (see FIG. 10 item 234) that are sometimes fully lit and sometimes shade-common with the rest of the array, where an "outer row" of panels is here depicted the same as a single "end panel" for simplicity (250), both being strings of series wired PV cells (220) forming quantity M (232) parallel long sets of cells (238) that are wired to a switching box (234) at one end, where the switching box (234) receives the shade-common circuits from the rest of the array (254) and also has jumper wires (252) from the far ends of the circuits of this row, and when these panels are not on the fully sun lit side of the array, the switching box (234) includes these sets of cells with the shade-common circuitry (254) before manifesting the array output at (256), or when at the fully lit end of the array the switching box (234) isolates these sets of cells from the shade-common circuits (254) by instead connecting those shade-common circuits directly to output (256) and connecting this fully lit set of cells (250) together into a single series electrical circuit (using jumpers inside the switching box (234)) resulting in a separate PV circuit that is output at (258). This "outer row" circuit, or a series connection of "end panel" circuits together, are then separately converted to AC or integrated into the inverters shown in FIGS. 13 & 14 with the addition of another DC->AC converter module matched in size to this one outer row or set of end panels.

Figure 13:
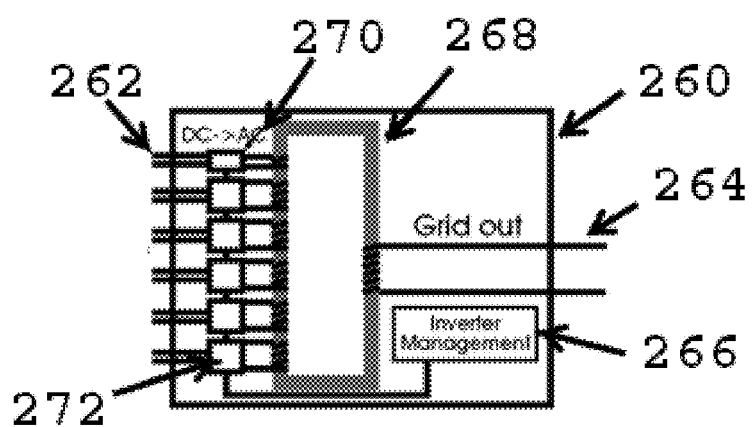
FIG. 13 shows one possible configuration of a multi-circuit integrated inverter assembly.

FIG. 13 shows one possible embodiment of a multi-circuit integrated inverter assembly (260) that converts the multiple input circuits from the various shade-common and "outer row" circuits (262) into output "grid" power (264) under computer control (266) in this case using a transformer (268) for flux-additive and voltage adapted output (high volt output possible) where multiple individual DC->AC converter modules (270 and 272) are used thus limiting the size of each converter compared to the net inverter power output (264), where converter (270) is shown as being smaller as needed for the partially shaded circuit which is never more than one string circuit. Another small converter can be included for the currently fully lit "outer row".

Figure 14:
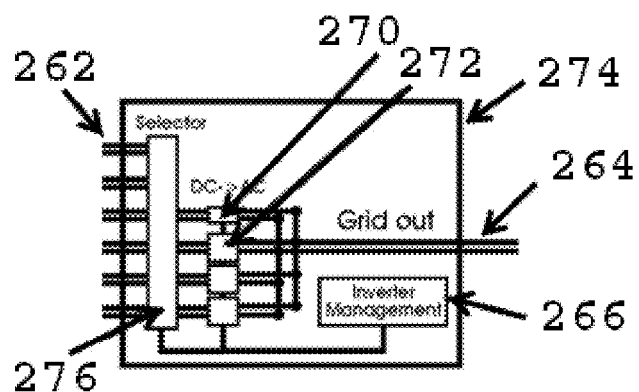
FIG. 14 shows an alternate inverter approach that converts the multiple input circuits from the various shade-common and "outer row" circuits into output "grid" power.

FIG. 14 shows one embodiment of an alternate inverter (274) approach that converts the multiple input circuits from the various shade-common and "outer row" circuits (262) into output "grid" power (264) under computer control (266) in this case using direct conversion where possible and the DC->AC converter modules (270 and 272) are sized to allow combining the inputs (262) into power-common circuits (matching V-I properties) using a selector (276) (also depicted in FIG. 15 and FIG. 16) thus reducing the number of conversion devices used while also limiting their size.

Figure 15:
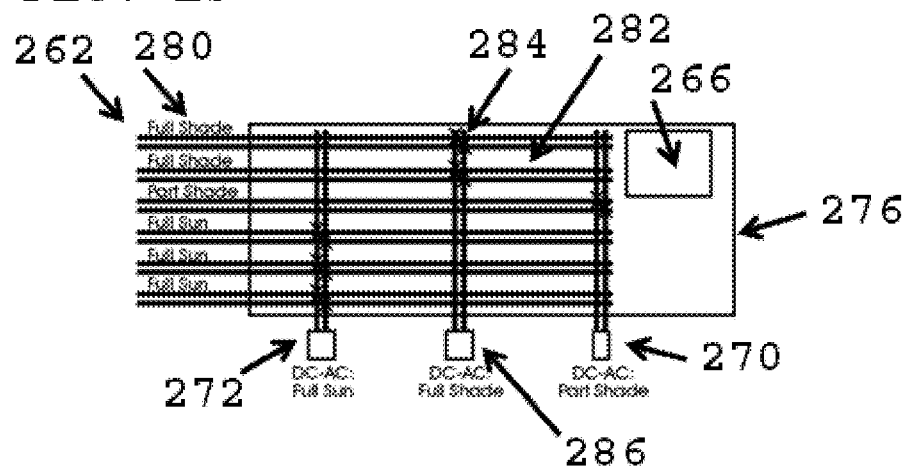
FIG. 15 is a depiction of the selector shown in FIG. 14 that connects the various PV cell circuits that are sometimes Full Shade, sometimes Full Sun, and sometimes Part Shade.

FIG. 15 shows one embodiment of the selector (276) shown in FIG. 14 that connects the various PV cell circuits (262) that are sometimes Full Shade sometimes Full Sun and sometimes Part Sun (280) to the DC->AC converter modules (270, 272, and 286) using what is functionally a cross-bar switch (282) by making connections (284) where needed to connect the inputs and outputs, always under internal selector control (266), in this case a configuration that uses the minimum number of AC->DC converter modules possible being one (286) for the Full Shade circuits and one for the Full Sun circuits (272) and a smaller one (270) for the Part Shade circuit because it is always limited to a single shade-common array row circuit. Furthermore, the Full Shade converter may be of a smaller size due to the lower power that set of circuits will produce.

Figure 16:
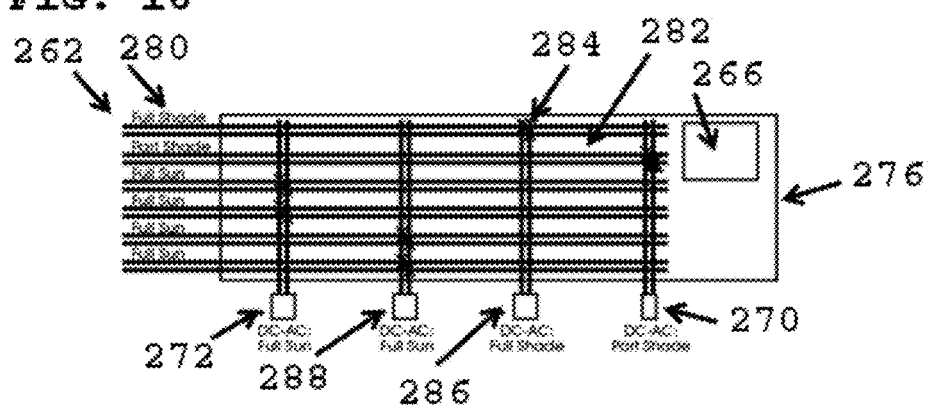
FIG. 16 is another variation of the selector shown in FIG. 14 allowing load sharing by more inverters.

FIG. 16 shows one embodiment of the selector (276) shown in FIG. 14 with all the same components as for FIG. 15, but this time there are more DC->AC converters such that each one can be of significantly smaller capacity than the Full Sun converter shown in FIG. 15. The purpose of this variation is for cost and reliability management, with the ultimate balance of net inverter output size and DC->AC converter count and size being a production/product optimization issue. Shown here in FIG. 16, the same six input circuits can be accommodated with DC->AC converters that will at most have to handle the power of two common circuits. This embodiment of the selector (276) connects the various PV cell circuits (262) that are sometimes Full Shade sometimes Full Sun and sometimes Part Sun (280) to the DC->AC converter modules (270, 272, 286, and 288) using what is functionally a cross-bar switch (282) by making connections (284) where needed to connect the inputs and outputs, always under internal selector control (266), in this case a configuration that minimizes the sizes of the AC->DC converter modules being one (286) for the Full Shade circuits and two for the Full Sun circuits (272 and 288) and a smaller one (270) for the Part Shade circuit because it is always limited to a single shade-common array row circuit.

Figure 17:
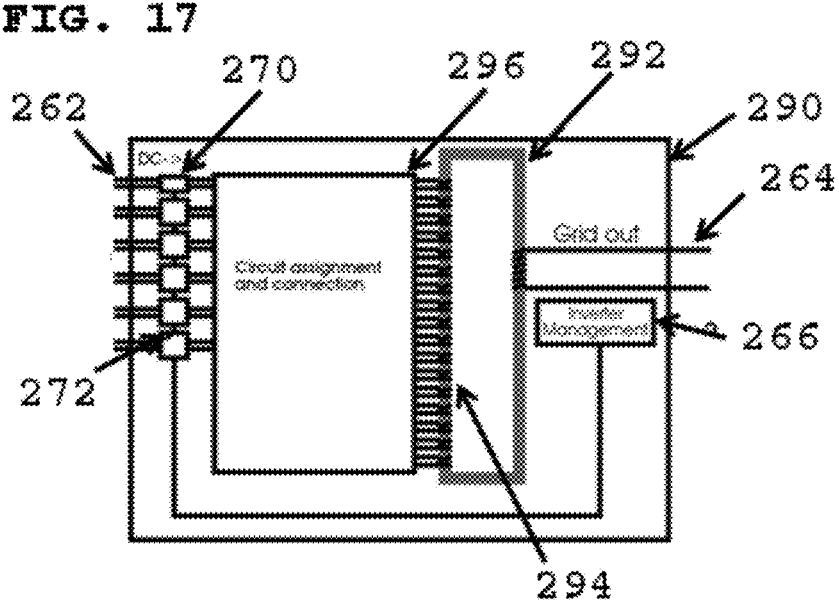
FIG. 17 shows an embodiment of a new inverter design for optimal solar array circuit assignment to a "digital transformer"

FIG. 17 shows one embodiment of a new inverter (290) capability with inputs from the solar array (262) and grid power output (264) under computational control (266) where a special transformer (292) has a large plurality of primary coils (294) that are connected in parallel and series and combined parallel/series in a circuit connection component (296) which also contains the sensors and mathematics needed to decide how best to connect the large plurality of primary coils (294) to the outputs of the primary DC to AC converters (270 to 272) for optimum overall conversion of the solar array power to AC.

Figure 18:
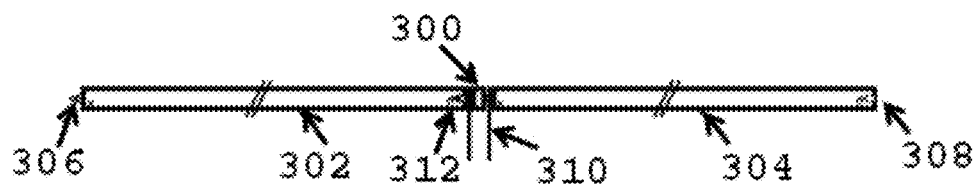
FIG. 18 shows an embodiment of a PV array circuit monitoring device as installed with the embedded connectors shown in FIG. 6.

FIG. 18 shows one embodiment of a PV array circuit monitoring device (300) which is inserted between panels (302 and 304) where each panel has a protruding connector (306) and receiving connector (308) where one of the protruding connectors is not seen because it is inserted through a cross frame member (310) and into the circuit monitoring device (300). The circuit monitoring device (300) also has a protruding connector which is not seen because it is inserted through a cross frame and into the receiving connector (312) of the left panel (302). In this depiction, the circuit monitoring device (300) is shown as sandwiched between two cross members (310) as may occur at the end of a truss section, but this particular configuration is not required so long as panel structural support is properly maintained.

Figure 19:
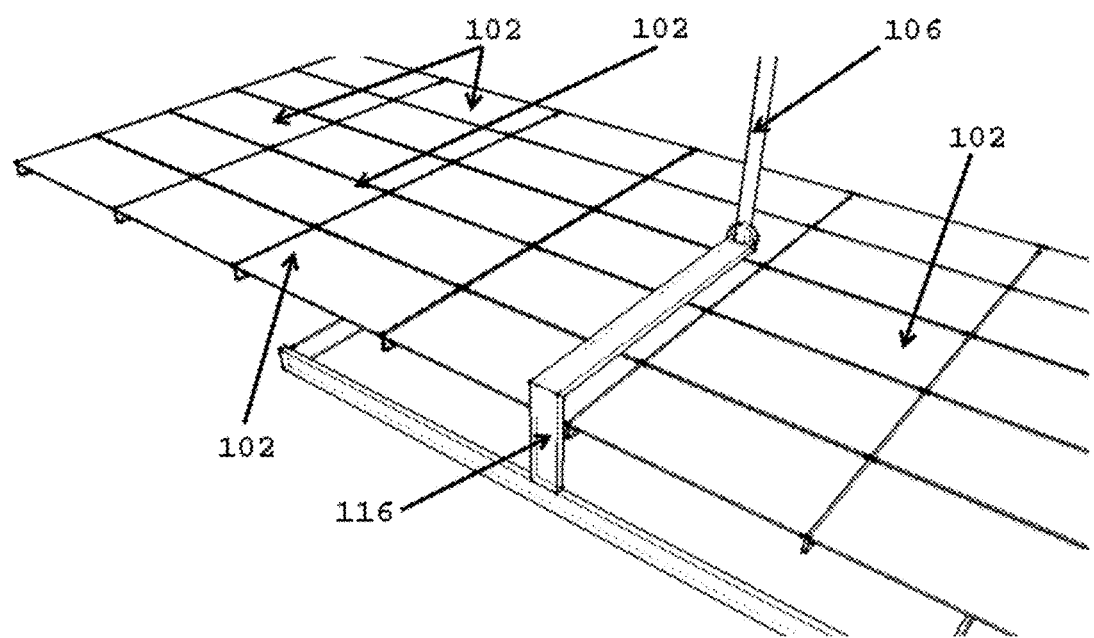
FIG. 19 shows in more detail the assembled PV array and crane moving attachment shown in FIG. 1.

FIG. 19 shows one embodiment of an array section transport attachment (116) for moving a completed array section (102) to poles or a rooftop mounting position by crane using its hook (106).

Figure 20:
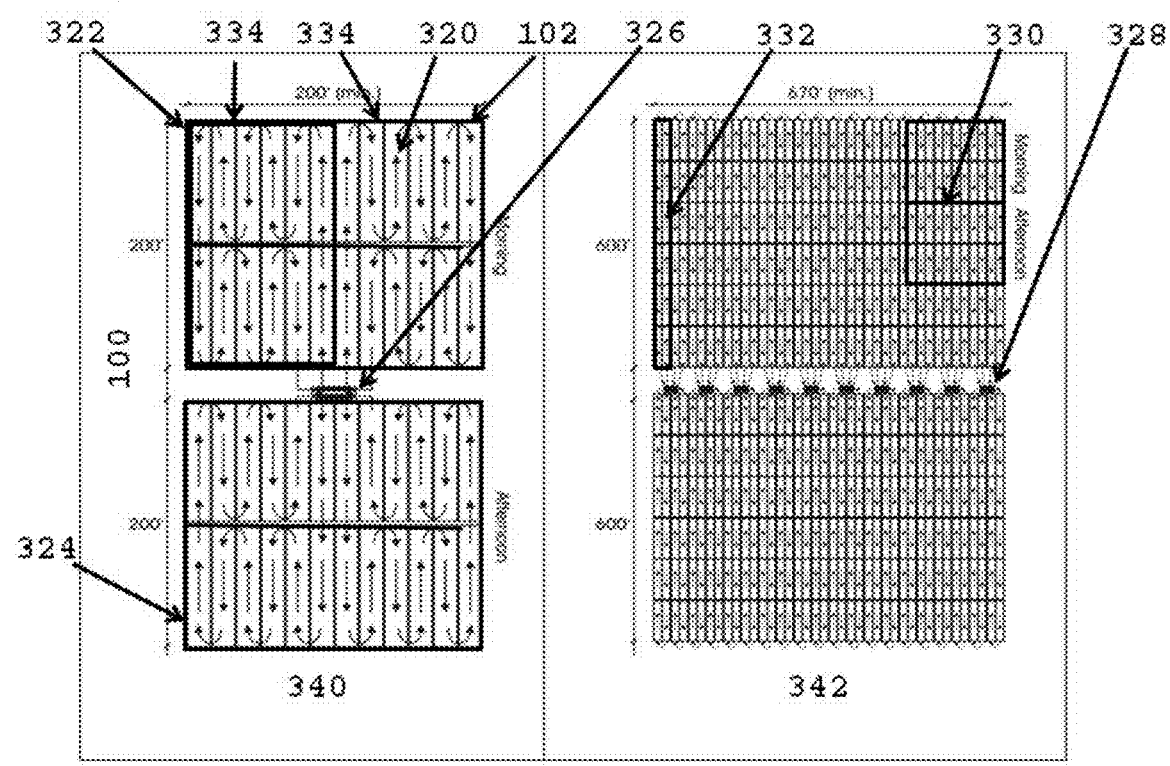
FIG. 20 shows possible embodiments of completed PV array electric circuit schemas.

FIG. 20 shows one embodiment of completed PV array electric circuit examples, showing how array sections (102) can be linked together into long circuits as depicted by arrows (320) into sections (322 and 324) which terminate at possible inverter locations (326) and (328) to make "typical" pre-designable array sections of varying shapes, herein showing both a compact unit (330) and elongated variants (332). The areas (322) and (324) generally depict the likely near-term half day installation target per robotic system at the rate of roughly 1 MW of PV panels installed per day. Higher daily installation rates are also possible. Included are the breakdowns showing 275 kW sections (334) possible inverter positioning for the two possible layouts shown (326) and (328), and further shown are two possible macro configurations with this system at 1000V being 1.1 MW (340) and 11 MW (342). A typical location for one day's assembly with the robotic assembly apparatus is shown at left (100).

Figure 21:
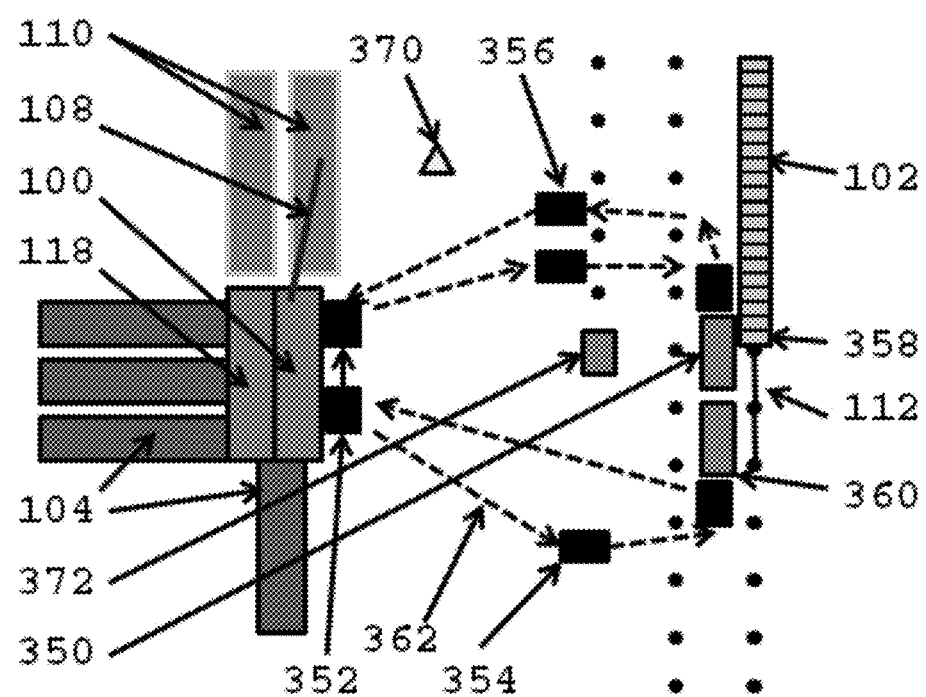
FIG. 21 shows an aerial view of a split-mode embodiment of a main element of a robotic assembly system apparatus including continuous resupply delivery "bots"
Figure 22:
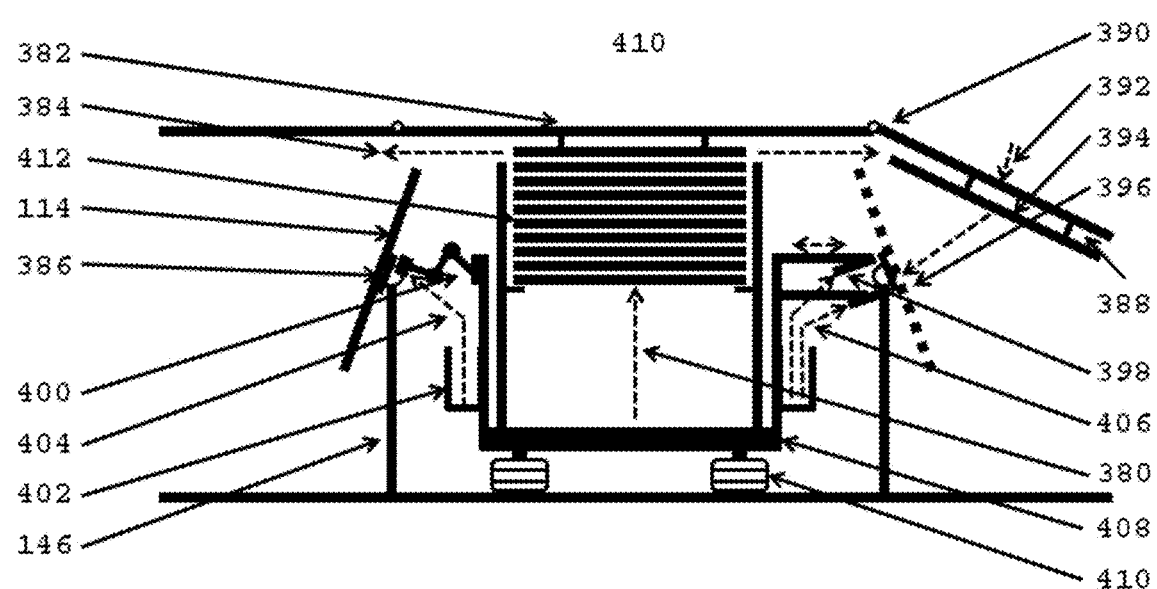
FIG. 22 shows in more detail a sectional view of the core robotic assembly system apparatus shown in FIG. 21.
Figure 23:
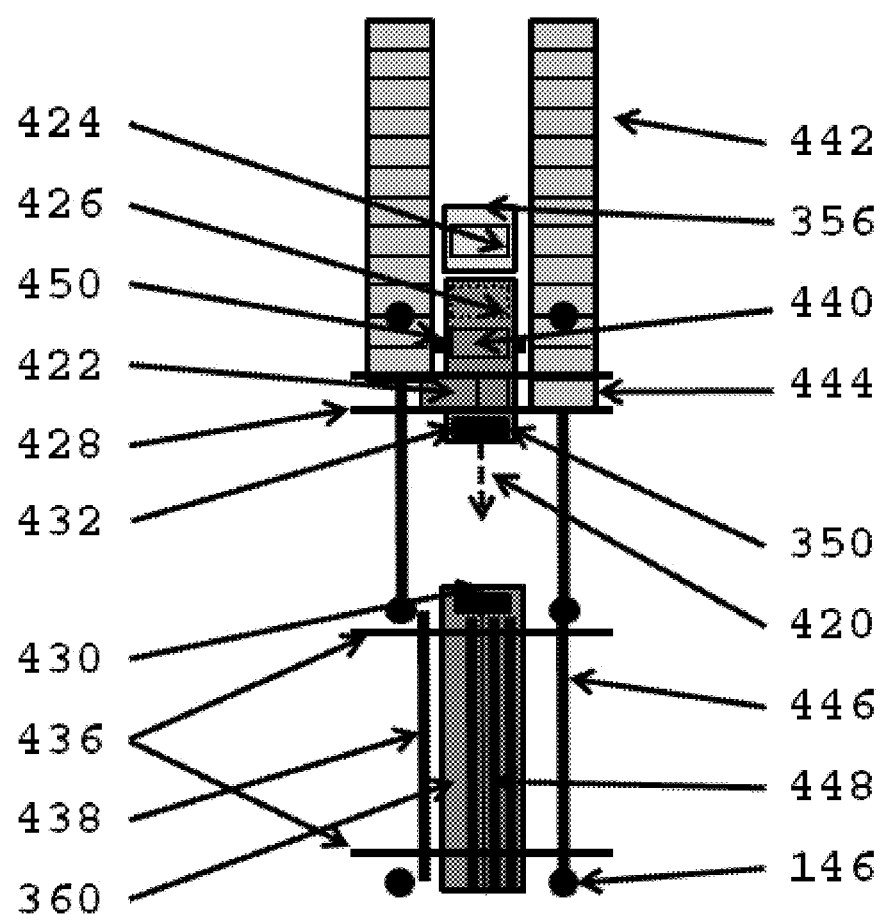
FIG. 23 shows an aerial view of the core robotic assembly system apparatus shown in FIG. 21 including a more detail depiction of the robotic truss installation apparatus.

FIGS. 21 through 23 show one embodiment of a fully automated assembly system in split mode unload/assembly where material unload capabilities are separated from the assembly which is done directly at the final installation location. The point here is to locate assembly at the poles when the trussed sections are too small for cost effective pre-assembly and transport, and to fully automate the electrical connection down rows. Material delivery from the container unload system is via "bots" under automated motion with supervision. "Assembly" is broken in this embodiment example into poles, beams/trusses, and panels (with electrical connection).

FIG. 21 shows an aerial depiction of the whole field of one embodiment of the automated PV array installation in split mode unload/assembly, including the unfolding core robotic material unpacking and handling capability in the form of robotic assembly apparatus (100), a crane component (108) for unloading truss sections from flatbeds (110) as needed, shipping containers (104) delivering material at an unfolded robotic unload platform (118), a moving Assembly Robotic apparatus (350), roving bots (352) positioned for material transport to the assembly apparatus, roving bots (354) for delivering truss sections (shown in 3 positions), roving bots for delivering stacks of PV panels (356) (shown in 4 positions). Also shown are already installed PV panel sections (102), a just installed PV panel (358), truss sections installed awaiting PV panels (112), and a truss Placement Robot apparatus (360), dashed lines showing example continuous material delivery paths for multiple material delivery bots in coordinated simultaneous operation (362), and a typical position where a field operations manager with remote controls may be standing (370). A support post mechanical installation robot embodiment (372), material delivery for post installation (not shown for simplicity, just as 254 and 256). In this FIG. 21 embodiment, single panel rows are being assembled—alternate similar embodiments could also install rows with multiple panels across and two adjacent rows at one time.

FIG. 22 shows a sectional depiction of one embodiment of the automated moving in-situ PV array assembly apparatus (350) shown in FIG. 21, in this case including adjacent row simultaneous installation with a PV stack (412) being fed (380) to installing rack (382), dashed arrows showing panel movement for installation (384) onto a PV array support post (146) mounted truss (386), a rack system for panel transport including grabbing devices (388) (design is different for ½ rows and 1 to N panels/row); an installed PV panel (114), a hinge point for transferring panel(s) from feed position to installation position (390), a dashed line shows direction of motion for hinged section of installation rack (392), a PV panel being moved to installation position (394), a position of PV panel for attachment to tracking rack on poles (396), a purpose-built bolting/connecting apparatus (398) shown on one side and an alternative more generic robotic arm for bolting (400) shown on the other side, a bolt/connector bin (402) with a single bolt/connector feed pattern shown as a dashed line (404) or a multi-bolt/connector feed pattern (406), a self leveling/aligning Assembly System platform (408), and example track-mode drive mechanism (410). Not shown (hidden) is another set of robotic arms for connection and securing of the electrical cabling between panels, possibly with specialized grabbing devices for this purpose (behind what is shown here, and only needed if the electrical connectors are not built-in to the adjoining sides or ends of the panels).

FIG. 23 shows an aerial depiction close up of one embodiment of the automated moving in-situ PV array assembly apparatus shown in FIG. 21 including both the panel assembly systems and the truss installation system for installing the truss supports between the posts. In this depiction are 3 separate units being the panel assembly bot (350), a Truss Placement Robot (360), and one of several roving bots for delivering stacks of PV panels (356), with an assembly apparatus direction of motion as depicted by the dashed line (420). Also shown is a PV panel while being moved to the left row of panels (422), the moving PV Assembly Robot (350) with a small rectangle showing a PV panel delivery position (426), a stack of PV panels being delivered (424), overhead rails and mechanisms for moving PV panels from stack to installed position (428), a generator and other utilities and automated controls for the Truss Placement Robot operations (430) and for the PV Assembly Robot (432), overhead rails (folding) for truss placement on the left row (436), a truss section being positioned to the left row (438), an area of PV panels already installed (442), a staging area for stacks of PV panels delivered from the bots to increase output (440), a PV panel just moved into mounting position (444—attachment apparatus not shown in this perspective), an already installed truss section ready for receiving panels (446), additional truss sections loaded onto Truss Placement Robot (448), a typical already installed post (146), and PV power wire connection robotic arms (450—both sides).

Figure 24:
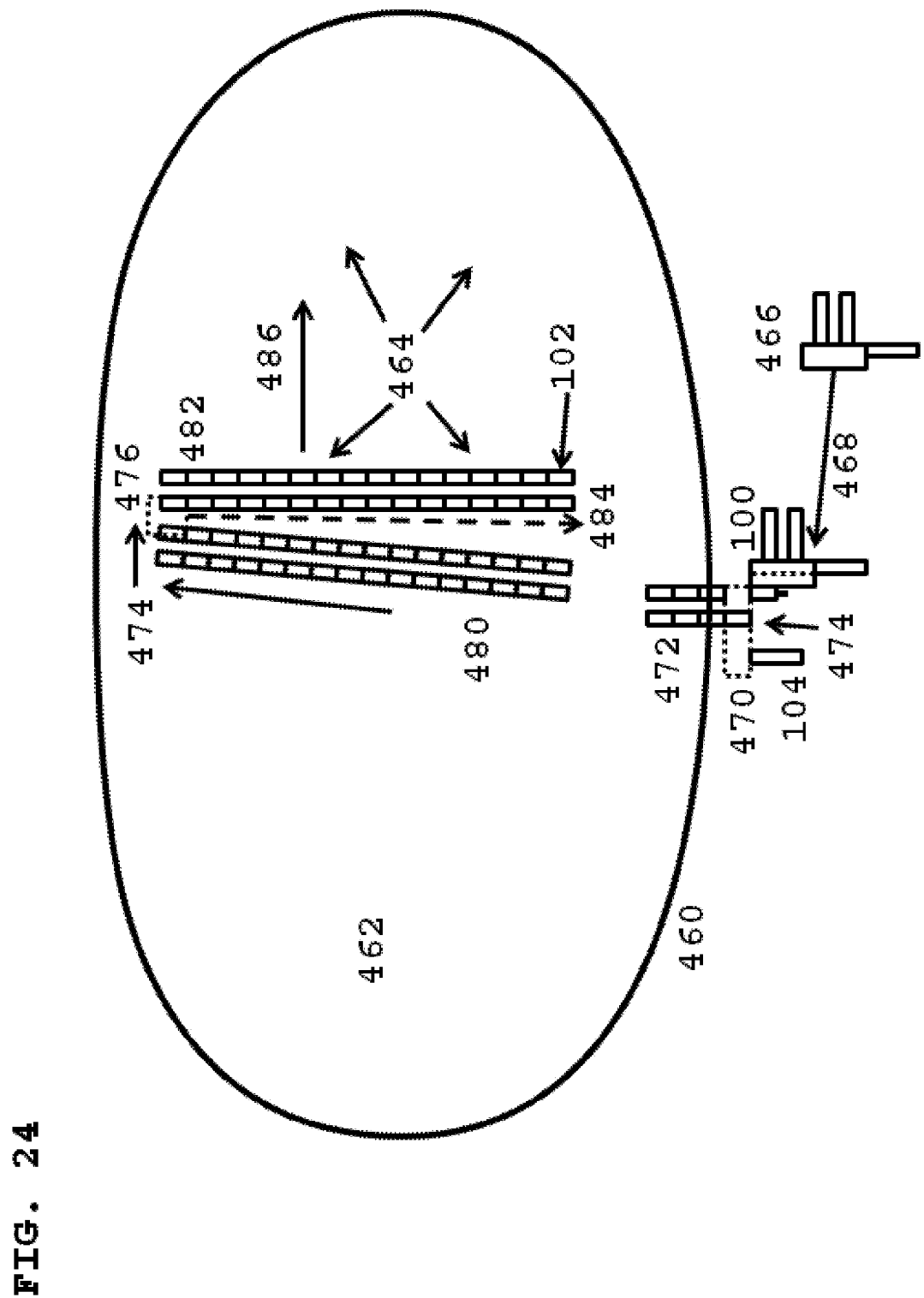
FIG. 24 shows an aerial view of one embodiment of the work layout for the core robotic assembly system shown in FIG. 2 applied to assembly of floating PV arrays.

FIG. 24 shows an aerial depiction of one embodiment of the PV array robotic assembly apparatus (100) being used here at the shoreline (460) of a lake (462) to construct and install a floating PV array (464) that will be several completed array sections (102) long and several completed rows wide. The robotic assembly apparatus (100) may be used near the shoreline (460) in either a unified mode such as depicted in FIG. 1 or a split mode with material unload moved to a more accessible location (466) with an automated component material movement apparatus employed to advance unpacked material to the core assembly apparatus (468) as needed. As sections are built and assembled (100), they are connected to floats and frames in an automated float attachment apparatus (470—dashed outline) in continuous form and advanced (472) into the body of water (462). Material for the float assembly apparatus can be unloaded from shipping containers (104) directly. For convenience, assembly may be by building one array section (102) and moving it to the side (474), building at least a next section (102), and connecting them all to floats and frames in the float attachment apparatus (470) and then advancing into the water (472). Once a whole row or row set (480) is completed, it is positioned (474) adjacent to the already installed rows (482), attached by a robotic "stitching" apparatus (476—dashed outline) which aligns and connects the new row (480) to the already installed rows (482) while moving down the row one pole and frame at a time (484), and the whole completed portion of the array can be moved (486) to make room for more assembly. Array rows will likely be assembled in 2- or more-wide form so they are self stabilizing when floated, and/or a temporary "float row" is used for stabilization (not shown here). Single-wide rows may be possible (and faster) with the temporary float row system. Additional assembly positions (470) are added for integrating the flotation and frames portion of the completed system.

Figure 25:
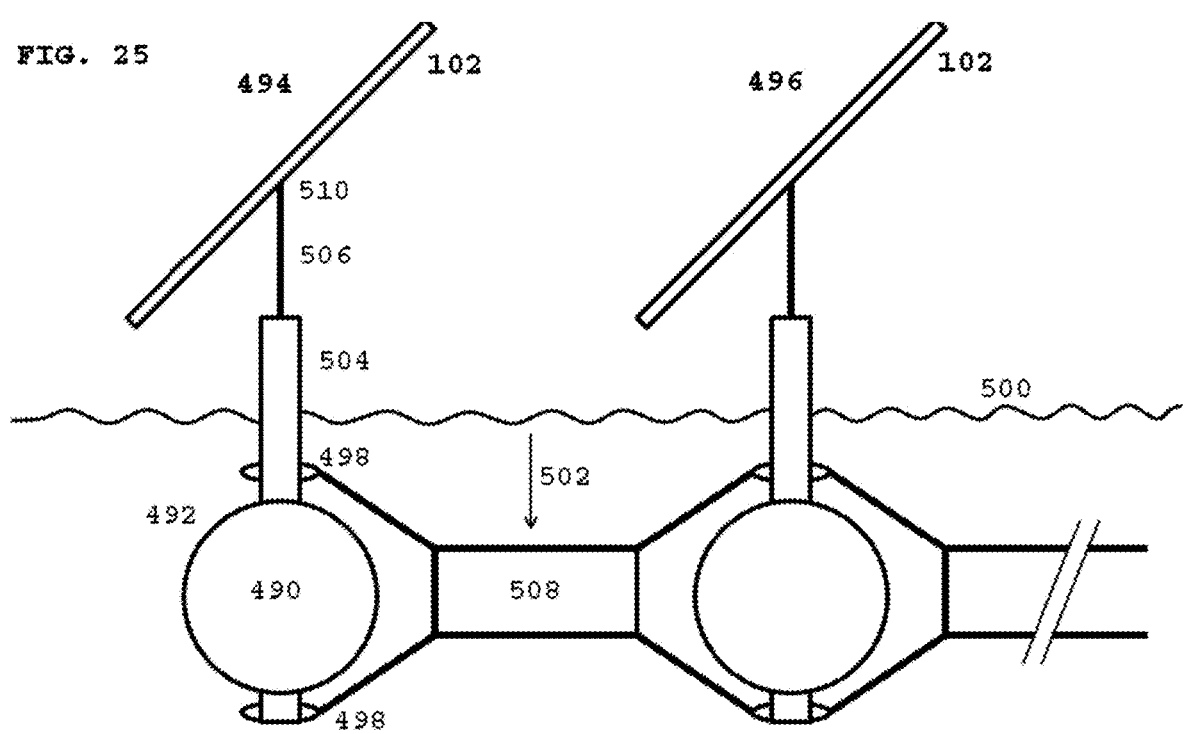
FIG. 25 shows a sectional view of one embodiment of the assembled floating PV array shown in FIG. 24.

FIG. 25 shows a sectional depiction of one embodiment of the partially underwater inter-row support structure and floats used to float the pole-mounted tracking system on water (500) and hold its structure. The embodiment depicted here is a scheme which places floats under every pole. The "truss" element (508) is any frame or pole/frame and cable approach for controlling separation and keeping the posts parallel. Included are a float (490) and support structure (492) portion of a robotically assembled floating PV array (102), shown here being two adjacent rows (494 and 496), where the float structure (492) includes frame mounting positions (498), a vertical portion (504 and 506) terminating in a PV array section mounting position (510), a space for boats for access (502), and where the float portion includes some flotation material (504) up the post (506) to maintain stable buoyancy to keep wave action from affecting the array (i.e., poles are kept rigid relative to each other).

Figure 26:
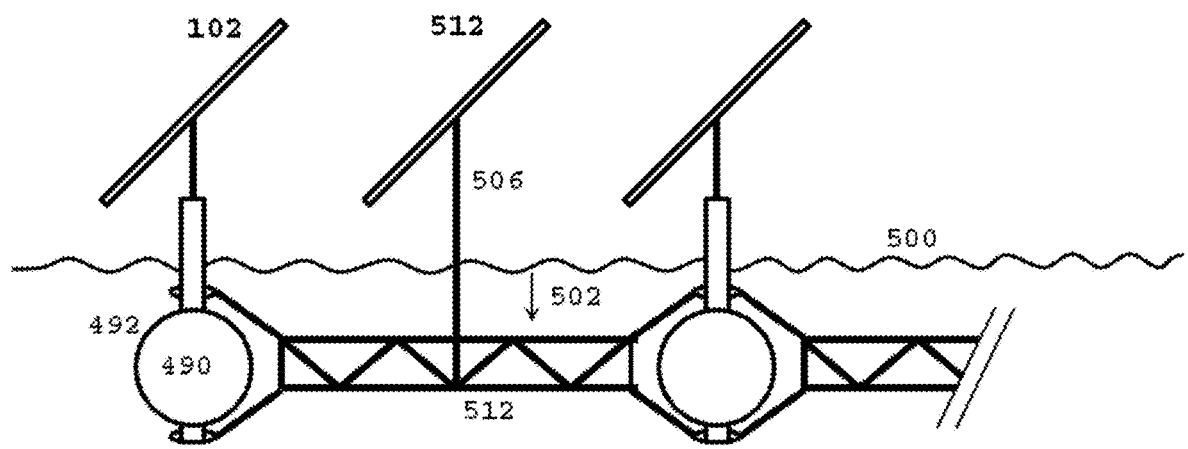
FIG. 26 shows a sectional view of another embodiment of the assembled floating PV array shown in FIG. 24.

FIG. 26 shows a sectional depiction of another embodiment of the partially under water (500) inter-row support structure and floats used to float the pole-mounted tracking system on water and hold its structure, here showing a variant of FIG. 25 which places floats (490) only under some of the rows and uses an extended truss element (512) to support the rows that do not have a float under them (514) while still maintaining boat access (502). The use of floats only on alternate rows is shown here. The point is there is an economic tradeoff between trussing (512) and flotation (490) and array rigidity, and various combinations of the elements shown will be employed as needed for cost effectiveness.

Figure 27:
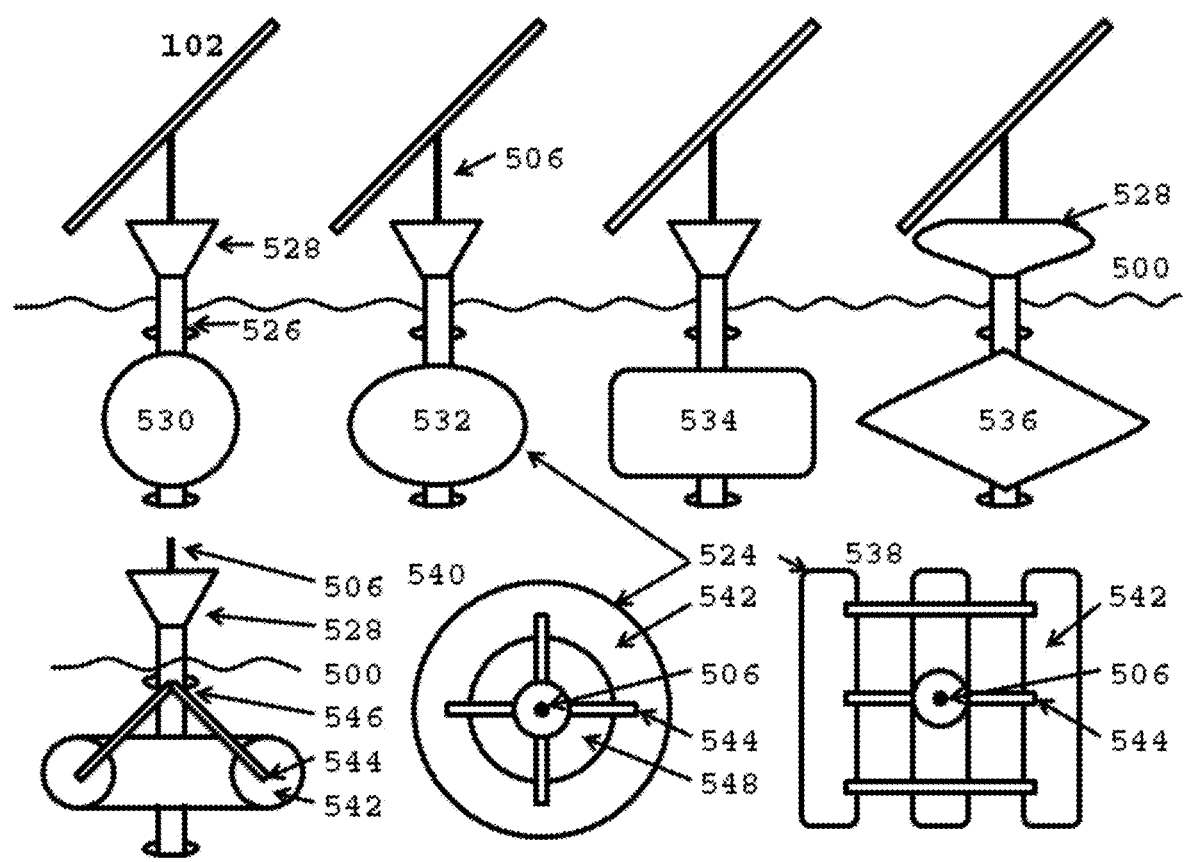
FIG. 27 shows sectional and plan views of several embodiment options of the floats employed in the floating PV array shown in FIG. 24.

FIG. 27 shows a sectional depiction of several alternative embodiments for the underwater floats and float structures. A fundamental point of this invention is to maximally eliminate wave action from affecting the array structure. The shown set of float embodiment options is only an initial set to be tested to see what will work best and be affordably manufactured, and is thus not inclusive. The embodiments include combinations of: metal or fiber-reinforced plastic frame (544) and pole (506), Styrofoam or similar space holding material inside plastic enclosures for durability (e.g., 524), a bulbous part of the float being sub-surface with a portion extending upward (526), and a larger float at the top (528) above the water line (500) to accommodate increased loads (e.g., rain and snow). Possible variants include round (530), diamond (536), cylinder (534), ellipsoid (532), and raft (538) and donut (540) shown in alternate section and plan views depicting pole (506), float (542), external frame (544), truss anchoring positions (546), and the inside of the donut without floatation material (548).

Figure 28:
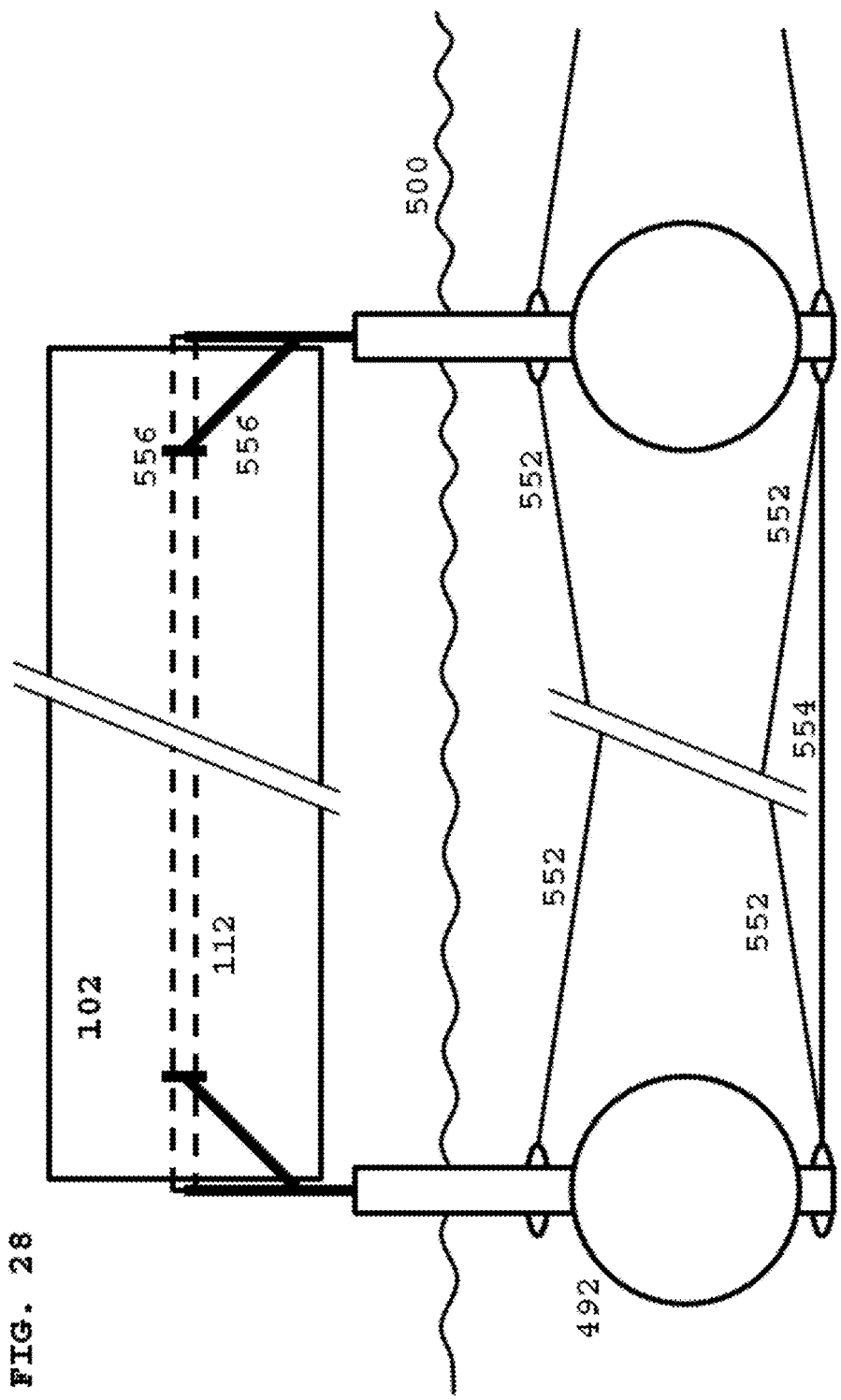
FIG. 28 shows a longitudinal sectional view of one embodiment of the assembled floating PV array strings shown in FIG. 24.

FIG. 28 shows a sectional depiction of one embodiment of the partially under water (500) longitudinal row array section (102) with structure implemented between the float support structures (492) here using tension cables (552), a spreader bar (554) as needed, and optionally lateral supports (556) that utilize the assembled array section truss (112) to give it a secondary function of holding the float supports (492) generally perpendicular to the truss (112).

Figure 29:
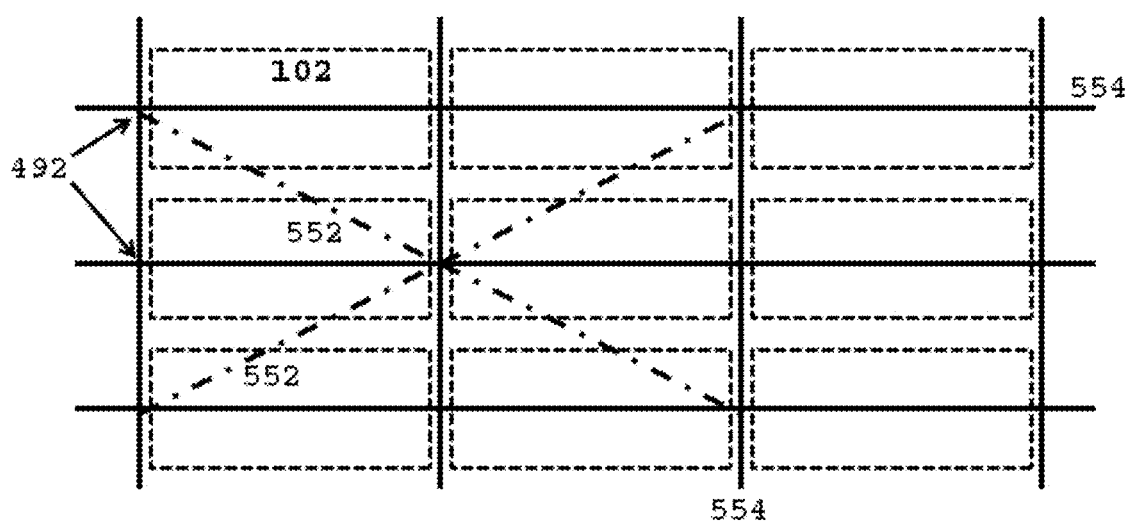
FIG. 29 shows a plan view of one embodiment of the assembled floating PV array shown in FIG. 24.

FIG. 29 shows a plan view depiction of one embodiment of the partially under water longitudinal row structures (554) of completed panel sections (102—shown in dashed outline) and adjacent row structures all implemented between the float supports (492), where tension cables (552, shown here as dot-dash lines) are used to establish array horizontal shape structural integrity, installed diagonally between adjacent float support structures (492) as needed to control "parallelogram" deformation of the array.

Figure 30:
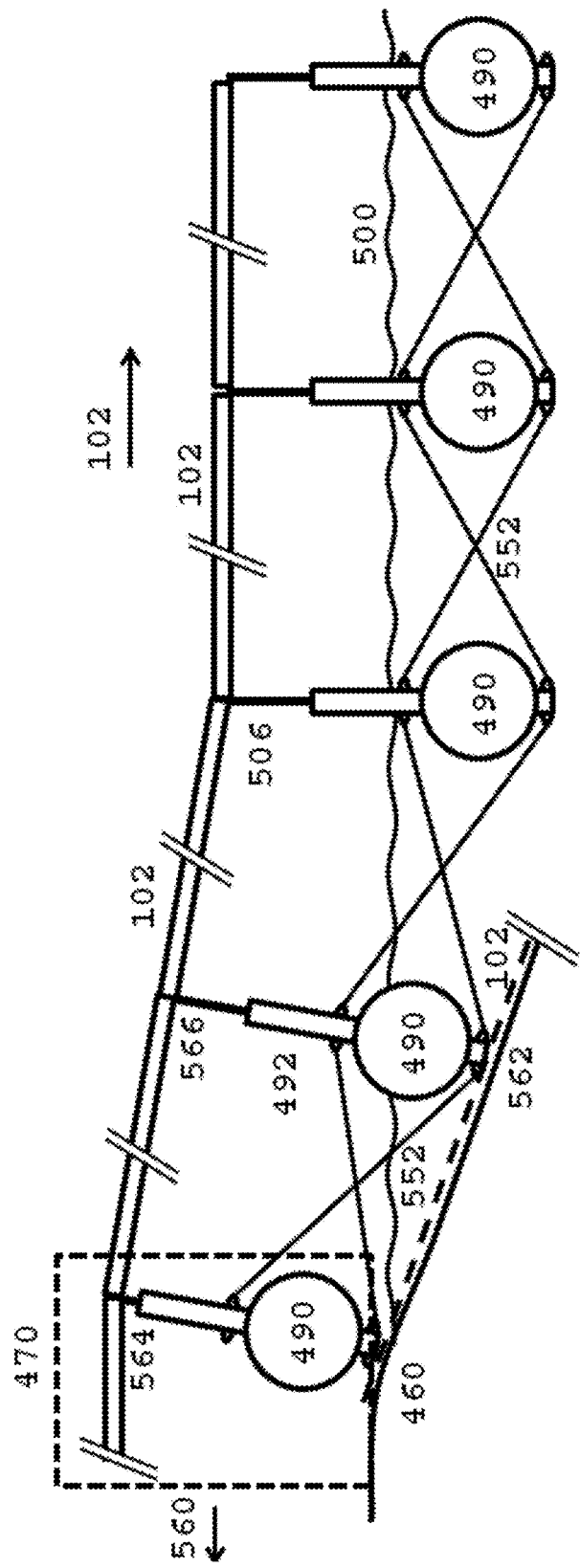
FIG. 30 shows a longitudinal sectional view of one embodiment of the floating PV array shown in FIG. 24 as it is being assembled and fed from the core assembly area into the body of water.

FIG. 30 shows a sectional depiction of one embodiment of the robotically assembled floating PV array as it is being fed into the water (500) at the shoreline (460) with PV panels assembled onto beam/truss members out of view to the left (560) and completed array sections (102) attached by the automated float attachment apparatus (470) to the top of the float structures (492) which also adds the row-longitudinal tension cables (552). A temporary "skid track" (562) is installed across the shoreline (460) so the assembled PV array sections with attached float structures can slide into the water without disturbing the ground or getting stuck in the mud, and which includes apparatus for completing the longitudinal tension cable attachment. The poles extending upward from the floats may be compressed (564) to shorten for assembly thus to accommodate any sloping terrain, and will be fully extended (566) by automated apparatus as the float structures enter into the water.

Figure 31:
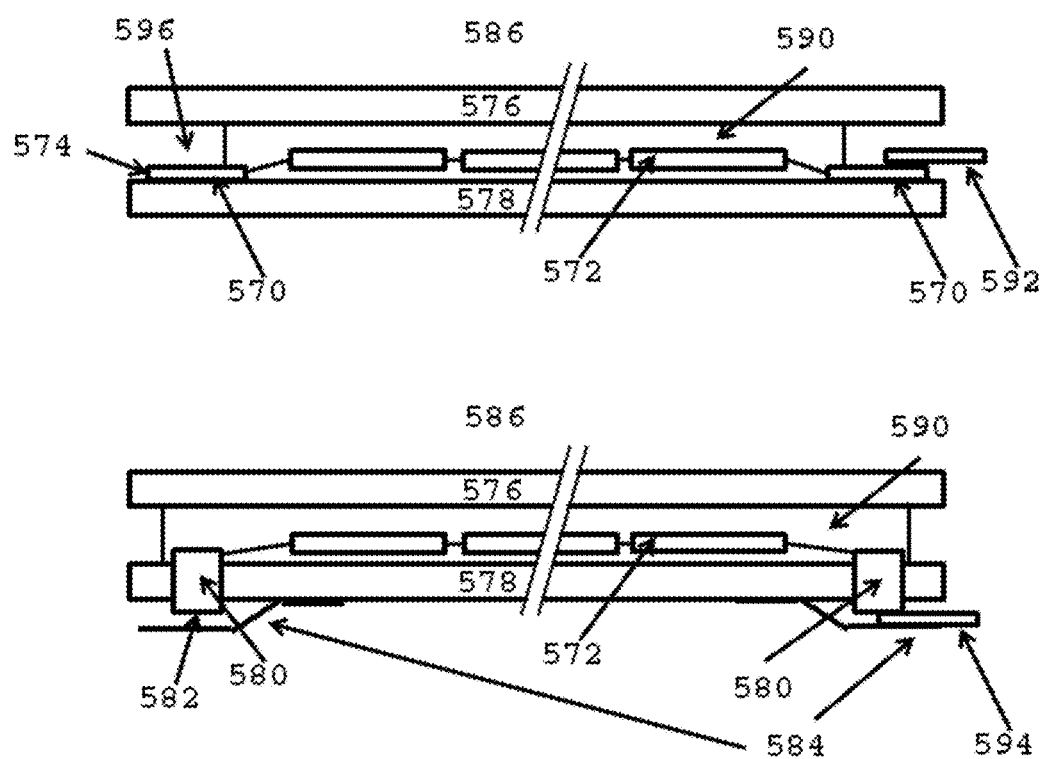
FIG. 31 shows possible embodiments of a new PV panel integrated electrical connector.

FIG. 31 shows a sectional view of two possible embodiments of a new PV panel integrated electrical connector, including a compression engaged flat connector (570) wired to at least one cell row (572) in a PV panel (586) optionally filled with encapsulant (590) where the connector is recessed within the end (574) of the panel between the front (576) and back (578) sheets to meet safety regulations but left at least partially un-encapsulated (596) so it can be electrically connected to with an insertion connector (592) shown herein connecting to only one end of the PV panel. Another possible embodiment of the new PV panel integrated electrical connector includes an electrically conductive element (580) that transitions through the back sheet (578) of the PV panel, where the electrically conductive element is connected to at least one cell row (572) in the PV panel (586) and to which an electrical connection is made by compression against the exposed part (582) of the electrically conductive element, and over which a non-conductive cover (584) is permanently installed onto the PV panel to meet safety regulations, and electrical connection made with an insertion connector (594) shown herein connecting to only one end of the PV panel. Other variations of non-wire and non-junction box PV panel embedded electrical connectors are envisioned as well.

What is claimed is:

1. Apparatus in the form of a field-deployable robotic system for automated assembly and installation of floating solar arrays, said apparatus including:
    a robotic sub-system for assembling fully completed solar array sections from component elements as shipped to an assembly site; and
    a robotic sub-system for integrating the completed solar array sections with floating posts and associated structural components into floating array sections, and for connecting and delivering continuous rows of floating array sections into an adjacent body of water;
    said robotic system being contained for transport in shipping containers with self-deploying sides to form work platforms.

2. The apparatus of claim 1 wherein component elements as shipped is opened and unstrapped adjacent to the work platforms, and a robotic fork lift is used to move pallets of material from those shipping containers and a robotic crane device is used to move truss sections to their required position for the robotic sub-system for assembling.

3. The apparatus of claim 1 wherein the robotic sub-system system for integrating the completed solar array sections with floating posts and associated structural components further includes a robotic stitching element to connect each completed floating array row to earlier floated rows to fully assemble complete floating solar arrays, wherein said stitching element pulls the floating but not yet connected and already connected rows together in proper alignment and completes the structural connection.

4. The apparatus of claim 1 wherein said robotic sub-system for assembling fully completed solar array sections comprises an apparatus to unload truss elements as delivered and position them for assembly, including unload and position a truss, unload and move cross members from pallets to their mounting positions on the truss, and unload and move panels from pallets to their mounting positions on the cross members, and to assemble those elements with any necessary bolts into complete solar array sections.

5. The apparatus of claim 4 wherein said robotic sub-system for assembling fully completed solar array sections builds completed solar array sections by the repetitive process of moving one truss into assembly position, mounting a cross member to the truss, placing a set of panels matching the width of the cross member, advancing the truss to the next cross member location, and repeating the cross member
    and panel set placement until the array section is completed, then moving the array section to a temporary holding location for processing by the robotic sub-system for integrating the completed solar array sections with floating posts and associated structural components.

6. The apparatus of claim 1 wherein the robotic sub-system for integrating the completed solar array sections with floating posts and associated structural components comprises an apparatus to unload floating structure elements as delivered and position them for assembly, including unload and position floating posts, unload and move floating structure elements from pallets to their mounting positions on the floating posts, capture and mount the fully completed solar array sections to the floating posts, and to feed completely assembled floating array rows continuously including any necessary bolts into the adjacent body of water.

7. The apparatus of claim 6 wherein the robotic sub-system system for integrating the completed solar array sections with floating posts and associated structural components comprises holding positions enabling construction of double-wide completely assembled floating array rows so they float without tending to capsize before connection to adjacent rows of the floating solar array.

8. A method of building a solar array directly from component elements delivered in shipping containers and on trucks, said method comprising the steps of:
    (a) providing a field-deployable robotic system for automated assembly and installation of floating solar arrays, said apparatus including: a robotic sub-system for assembling fully completed solar array sections from component elements as shipped to an assembly site; and a robotic sub-system for integrating the completed solar array sections with floating posts and associated structural components into floating array sections, and for connecting and delivering continuous rows of floating array sections into an adjacent body of water; said robotic system being contained for transport in shipping containers with self-deploying sides to form work platforms;
    (b) moving the robotic system to a desired position for the floating array sections being installed;
    (c) unloading the component elements automatedly from the shipping containers and flatbed trucks, including unpacking the component elements as necessary to be ready for use;
    (d), installing array supports automatedly including repeating step (c) as needed to unload more supports;
    (e) completing automated assembly of one solar array section, including repeating step (c) as needed to unload more of the solar array section component elements;
    (f) moving the completed solar array section to its final installed supports; and repeating steps (d) through (f) as needed until the entire solar array is installed,
    where the steps from (b) can be completed in overlapping time to maximize the net throughput of the process.

9. The method of claim 8 wherein said step of unloading the component elements comprises the further steps of:
    opening the sides of the robotic assembly system to form the work platforms for automated material movement;
    confirming the automated material unload and assembly areas are free of unintended human traffic, and halting automated unloading anytime unintended human traffic is detected;
    deploying an automated forklift to the work platforms for material movement from within the shipping containers to the assembly system;
    deploying an automated crane device for truss movement from the shipping containers and the flatbed trucks to the robotic assembly system;
    (g) placing opened shipping containers and flatbed trucks with the component elements adjacent to the work platforms and the automated crane;
    (h) unloading the structural components automatedly, completing any unpacking steps necessary for the structural components to be ready for use, and supplying the structural components to the robotic assembly and support installation systems;
    repeating step (h) at any time a supply of any structural component is low to assure continuous assembly; and
    removing any empty shipping containers and flatbed trucks, and repeating from step (g) as needed to assure continuous material availability for assembly.

10. The method of claim 8 wherein installing the array supports with the field-deployable robotic system comprises the further steps of:

deploying a self positioning support installation means;
installing a pre-engineered plan for support locations into the support installation means;
(i) retrieving the array supports for installation;
(j) moving to a next pre-engineered support location;
aligning the array support precisely with the pre-engineered plan using an automated precision positioning system;
installing the array support and any associated anchors; and
repeating from step (j) for the next array support position; including as needed step (i), until all necessary supports are installed.

11. The method of claim 8 wherein completing the automated assembly of one solar array section comprises the further steps of:
moving one truss into assembly position;
retrieving and mounting a first cross member to the truss;
(k) feeding a set of panels intended to be the width of the solar array section to their correct position along the first cross member;
aligning the panels with the first cross member;
retrieving and positioning a next cross member;
engaging the next cross member with unattached ends of the panels and causing those panels to engage with the first cross member, and attaching the first cross member to the truss;
optionally connecting and securing inter-panel wiring and panel grounding;
advancing the truss to position it for the next set of panels;
repeating from step (k) until panels equaling an intended length of the solar array section are in place; and
moving the completed solar array section to a holding position for delivery to its final supports.

12. The method of claim 8 wherein, the steps of installing array supports and moving the completed solar array section to its final installed supports together comprise the further steps of:
(l) retrieving a completed solar array section;
(m) optionally shifting the completed solar array section sideways and retrieving additional completed solar array sections to build a multi-row unit for installation, and repeating from (l) until an intended row count is reached for one row set;
attaching the retrieved solar array sections to any previously completed solar array sections already being fed into the body of water;
attaching the floating post structures including any truss members and structural components to the newly attached solar array sections to form a row set;
advancing the row set sections one array section length toward the body of water, while optionally attaching temporary floats to the row set as the row set is being fed into the body of water as needed for stability;
repeating from step (l) until a desired length completed row set is built and floatable;
advancing the completed row set fully into the body of water;
if a prior completed row set exists, positioning the desired length completed row set adjacent to the prior row set and using a robotic connection device to connect the new row set to the previous row set; and
repeating from step (l) onward until a desired number of completed rows is fully assembled into a completed floating array.

* * * * *